(12) United States Patent
Wilson et al.

(10) Patent No.: US 11,748,733 B2
(45) Date of Patent: Sep. 5, 2023

(54) METHOD AND SYSTEM FOR FACILITATING PERSON-TO-PERSON PAYMENTS

(71) Applicant: PANTHER PAYMENTS, LLC, New York, NY (US)

(72) Inventors: Mark Wilson, New York, NY (US); Rod Springhetti, New York, NY (US); Diane Scott, New York, NY (US)

(73) Assignee: PANTHER PAYMENTS, LLC, New York, NY (US)

( * ) Notice: Subject to any disclaimer, the term of this patent is extended or adjusted under 35 U.S.C. 154(b) by 475 days.

(21) Appl. No.: 15/977,974

(22) Filed: May 11, 2018

(65) Prior Publication Data

US 2018/0336542 A1 Nov. 22, 2018
US 2021/0049577 A9 Feb. 18, 2021

Related U.S. Application Data

(63) Continuation of application No. 13/462,073, filed on May 2, 2012, now abandoned.
(Continued)

(51) Int. Cl.
 G06Q 20/10 (2012.01)
 G06Q 20/22 (2012.01)
 G06Q 20/32 (2012.01)

(52) U.S. Cl.
 CPC .......... *G06Q 20/223* (2013.01); *G06Q 20/10* (2013.01); *G06Q 20/326* (2020.05)

(58) Field of Classification Search
 CPC .... G06Q 40/02; G06Q 20/4016; G06Q 40/06; G06Q 20/407; G06Q 20/223; G06Q 20/10; G06Q 20/326
 See application file for complete search history.

(56) References Cited

U.S. PATENT DOCUMENTS

8,639,602 B2 * 1/2014 Rao .............. G06Q 20/40
 705/35
2013/0124410 A1 * 5/2013 Kay .............. G07F 19/211
 705/43
(Continued)

FOREIGN PATENT DOCUMENTS

EP 2549421 A1 * 1/2013 ............. G06Q 20/10

OTHER PUBLICATIONS

Ling, Connie; Autopayment Programs Require Customers' Vigilance, Maintenance, The Wall Street journal Asia, Jun. 2, 1997.*

*Primary Examiner* — Ilse I Immanuel
(74) *Attorney, Agent, or Firm* — Smith Tempel; Steven P. Wigmore

(57) ABSTRACT

A Person-to-person payments method and system may include receiving a request from a computer network to transfer funds from a first account to a second account, almost instantly. An alias (mobile number or email) is received and is associated with the second account and checked against a database. If the alias exists, multiple options may apply for transferring funds. Next, a secure party identifier is generated and the transfer may be completed. A Payments Switch Module may also communicate with a Third Party Payment Service Provider a request from a Sending or Receiving Financial Institution or party, to send or receive funds from a specific account held by the Third Party Payment Service Provider. This may occur on an adhoc, automatic, or scheduled basis enabling management of 'personal cash concentration.' This feature with the Third Party Payment Service Provider be characterized as a "Bring it Home" feature of the system.

17 Claims, 17 Drawing Sheets

Related U.S. Application Data

(60) Provisional application No. 61/482,168, filed on May 3, 2011.

(56) References Cited

U.S. PATENT DOCUMENTS

| | | | |
|---|---|---|---|
| 2014/0089188 A1* | 3/2014 | Rao | G07F 7/1025 705/43 |
| 2015/0073984 A1* | 3/2015 | Andrews | G06Q 20/40 705/43 |

* cited by examiner

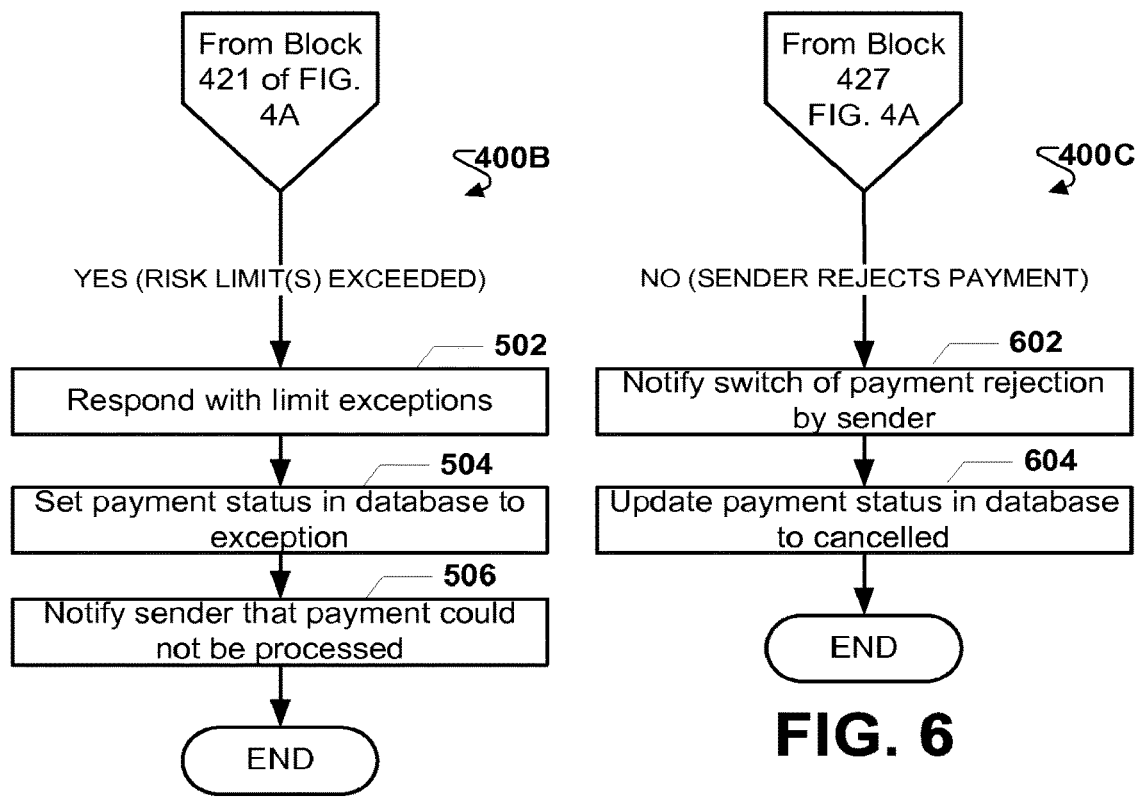
FIG. 5
FIG. 6
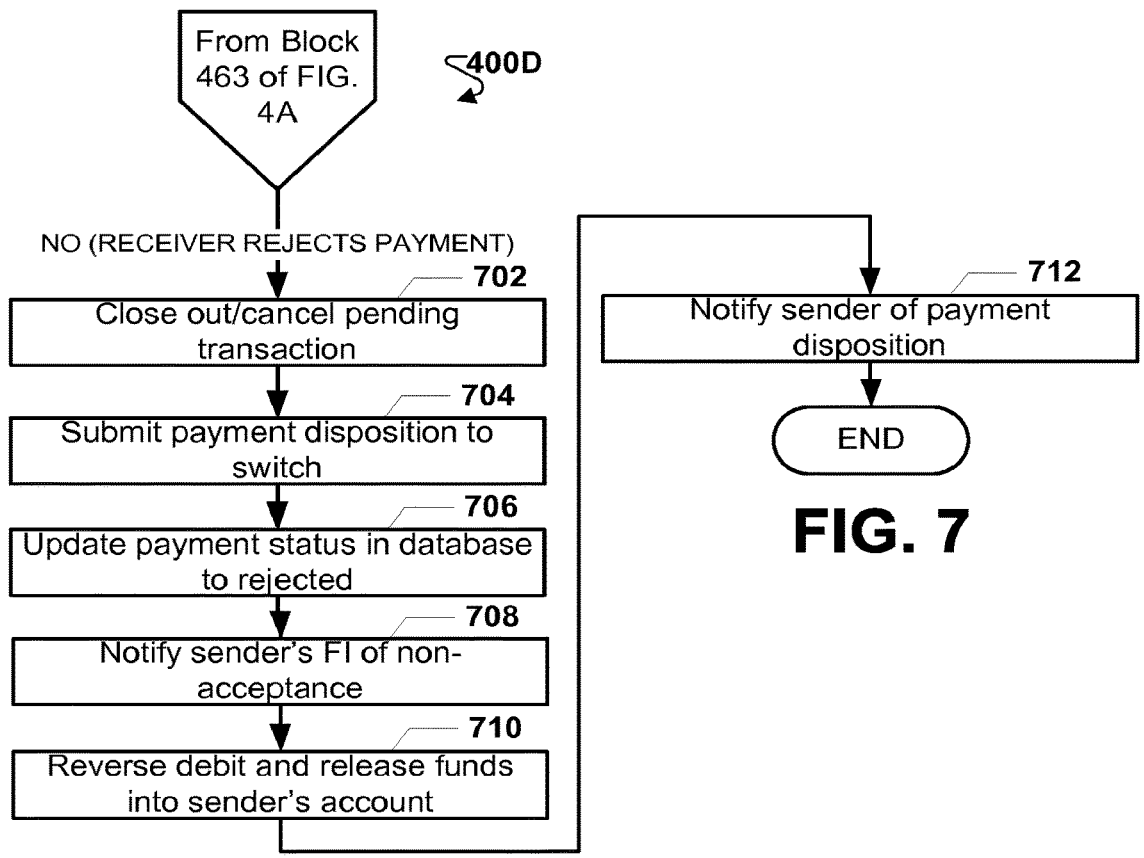
FIG. 7

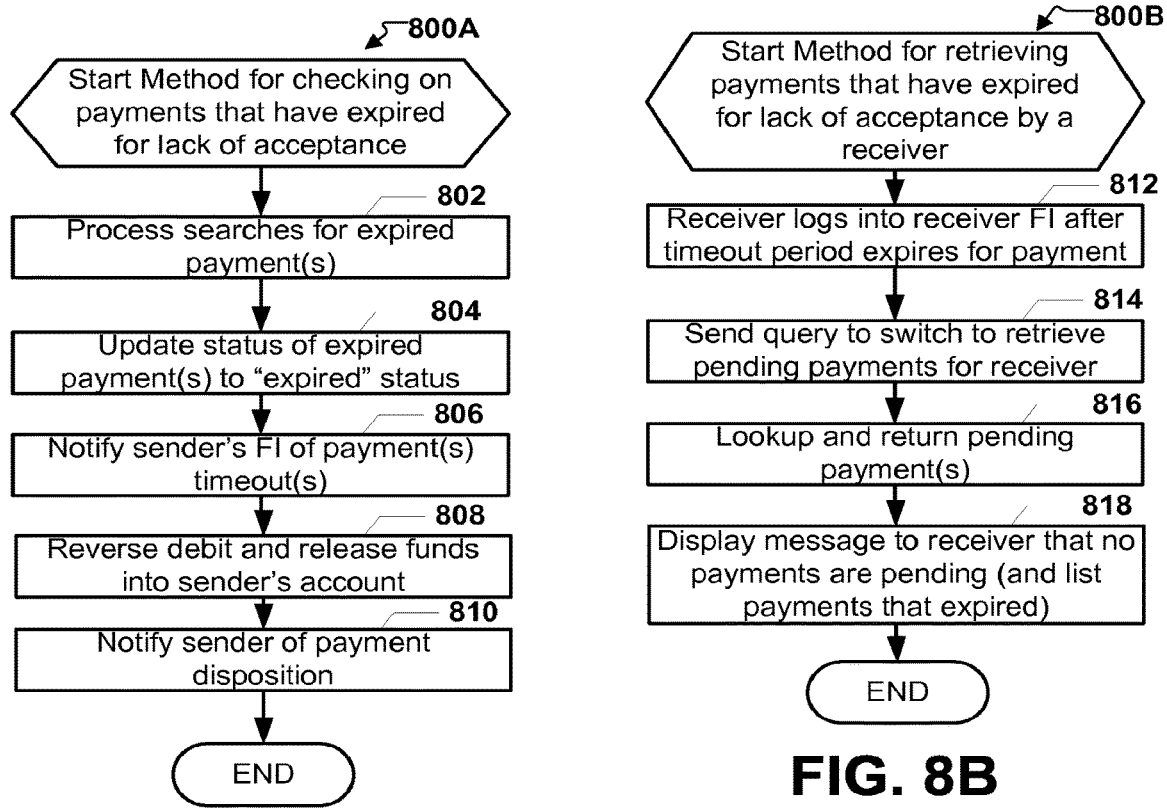
FIG. 8A
FIG. 8B
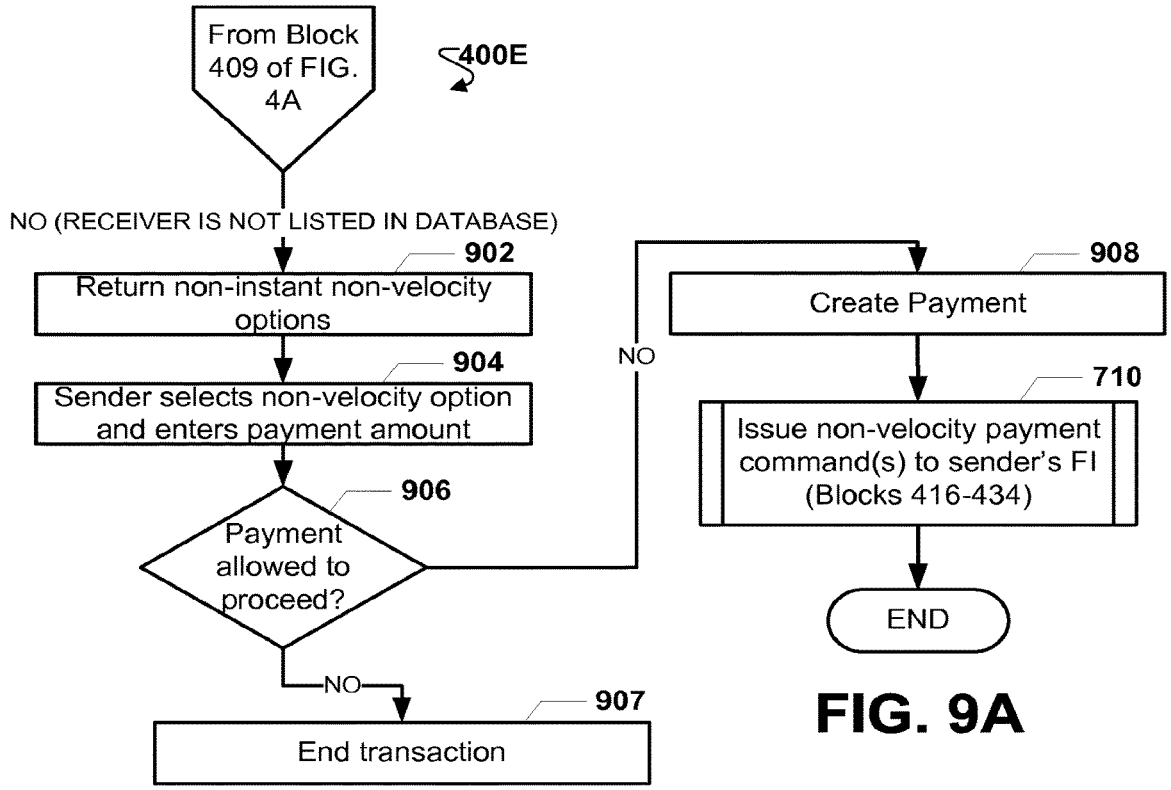
FIG. 9A

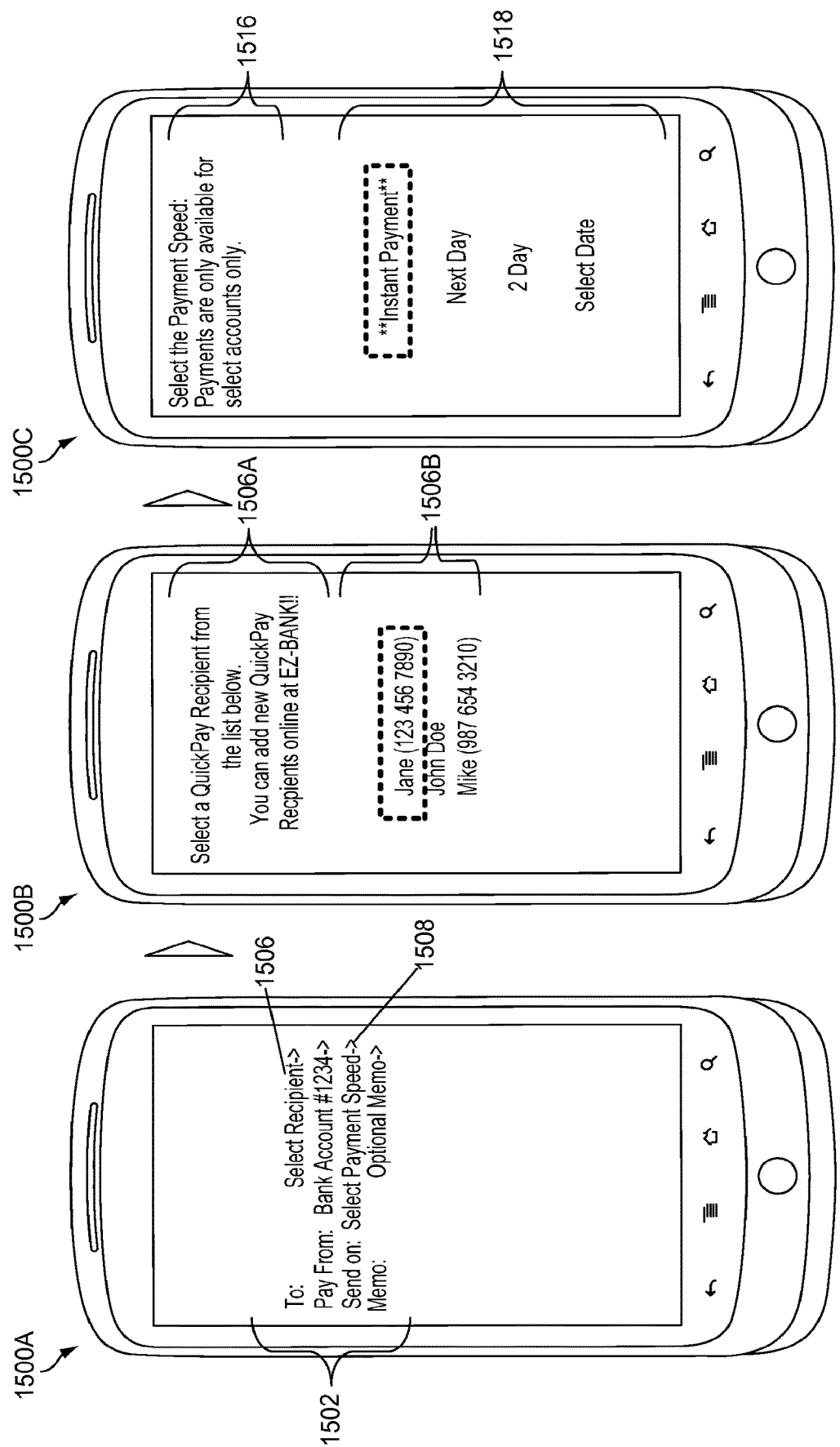

METHOD AND SYSTEM FOR FACILITATING PERSON-TO-PERSON PAYMENTS

PRIORITY CLAIM AND RELATED APPLICATIONS STATEMENT

Priority under 35 U.S.C. § 119(e) is claimed to U.S. provisional application entitled "SYSTEM AND METHOD FOR MANAGING PAYMENTS BETWEEN CUSTOMERS," filed on May 3, 2011 and assigned U.S. provisional application Ser. No. 61/482,168. The entire contents of this provisional patent application are hereby incorporated by reference.

BACKGROUND

In the person-to-person payments world, when people are exchanging value, traditionally they are paying with cash, credit cards, debit cards, or check. Now with portable computing devices, people are requesting that payments be made to each other electronically meeting a higher level of service (e.g. instantaneous).

Conventional electronic payment systems do exist that may provide payments for a person-to-person transaction. However, these conventional electronic payment systems usually leverage existing payment systems to transfer funds from a first party to a second party. The conventional electronic payment systems usually cannot transfer funds immediately such that the second party has access to the transferred funds in a matter of seconds. Currently, the second party may have access to the transferred funds within one or more business days relative to the time the transfer occurred.

Existing credit card-based solutions are usually not economical with respect to person-to-person transaction. Credit card-based solutions face issues in the way their networks are constructed: credit card-based networks have multiple parties such as a merchant acquirer, an acquirer processor, an issuer processor, and/or an issuer. All of these participants in existing credit card-based solutions usually get paid for their role in processing the financial transaction. Most of the credit card networks have been constructed around a consumer-merchant relationship which does not easily translate in supporting person-to-person payments.

The merchant in a consumer-merchant credit card based network model typically pays all of the participants who help manage the transaction for the credit card bearing consumer. Such a conventional solution usually includes interchange fees and discount rates as understood by one of ordinary skill in the art. Meanwhile, in a person-to-person transaction, the people involved in the transaction usually do not want to pay any fees for the transfer, similar to how cash may be handed from a first person to a second person without any transaction fees.

Another problem faced by conventional electronic payment systems is that such systems only provide transfers between accounts with like currency or account types. In other words, conventional electronic payment systems usually only transfer cash or dollar currency between a first account of a first party and a second account of a second party. Conventional electronic payment systems usually cannot transfer funds between two accounts which have different currency or account type.

For example, suppose a first party has a certain value in a music account and that first party wishes to transfer the value in the music account to an account of a second party. Suppose the account of the second party only handles or accepts cash or dollar currency. Conventional electronic payment systems cannot manage such a transaction between two different accounts having different currencies.

Another problem faced by financial institutions is that the accounts managed by third party payment service providers providing person-to-person services are becoming an attractive place for the customers to store funds that would normally be stored in a transaction account at a financial institution. This causes a depletion of assets at the financial institution.

For example, suppose a first party asks a second party to have rent payments made into a PAYPAL™ account rather than paying by check. Based on the financial services provided by PAYPAL™, the first party may choose to keep those funds in the PAYPAL™ account rather than transferring the funds to their transaction account at their financial institution. Had the second party used a traditional check, the funds would be stored in the transaction account at the financial institution.

Accordingly, a need exists in the art for an electronic payment system which provides the transfer of funds almost instantaneously in a person-to-person transaction. Further, there is a need in the art for electronic payment system which may support transactions between two different accounts of different parties having different currencies or account types in a person-to-person transaction. Further, there is a need in the art for electronic payments system which would provide for either manual or automatically transferring funds from a third party payment service account (i.e. like PAYPAL™ or AMAZON™ payments) on an adhoc or recurring basis to a receiver's financial institution;

SUMMARY

A method and system for facilitating person-to-person payments includes receiving a request from a communications network to transfer funds from a first account to a second account, including an alias that is associated with the second account. The alias may include at least one of a mobile telephone number and an e-mail address. A database is then checked at a Payment Switch Module to determine if the alias exists within the consumer alias registry. If the alias exists, then a message is generated for displaying one or more options on how the funds may be transferred from the first account to the second account and transmitted to the Sender Financial Institution, who contacts a Sender Portable Computing Device.

This message is transmitted over the Communications Network to a portable computing device. A selected transfer option is received by the Payment Switch Module from the Sender Portable Computing Device, either via the Sender Financial Institution or directly. Next, a secure party identifier is generated by the Payment Switch Module. The secure party identifier may include an abbreviated alphanumeric expression that is derived from at least one of a name, mobile phone number, e-mail address, and mailing address associated with the alias. This secure party identifier is then transmitted over the network along with a confirmation of the selected transfer option across the communications network.

The Payment Switch Module will communicate directly with the Receiving Financial Institution, and or the Receiving Portable Computing Device directly. Verification of the impending funds transfer will be provided by the Payment Switch Module, including a request for the Receiving Portable Computing Device to confirm desire to receive funds. Either the Receiving Financial Institution, and or the Receiving Portable Computing Device, responds to the Payments Switch Module, which in turn reports to the Sending Financial Institution for appropriate action.

Instantaneous payments will result in an end of day Net Settlement between Sending Financial Institution and Receiving Financial Institution, which is based on a Funds commitment between the parties. The Sending Financial Institution will debit the Sender's Account, and the Receiving Financial Institution may immediately credit the Receiver's account for immediate use of funds. If a next day or three to four day delivery time is requested, an ACH transaction will be initiated. The Payment Switch Module will track all transactions and provide an End of Day Net Settlement file to each participating Financial Institution.

The Payment Switch Module may also communicate with a Third Party Payment Service Provider, on behalf of a Sending Financial Institution, a Receiving Financial Institutions, or a Sending Portable Computing Device, and or a Receiving Portable Computing Device directly. In this method, the Payment Switch Module will communicate to the Third Party Payment Service Provider the request from the Sending or Receiving party (as described above) to send or receive funds from a specific account held by the Third Party Payment Service Provider. This request will include the alias and required password details of the sending or receiving party. The Payment Switch Module will communicate with all parties confirmation details of the transaction to ensure completion. Requests of this type may come from the Payment Switch Module on an adhoc basis, or on be regularly scheduled by Sender or Receiver.

The Payment Switch Module may also communicate with one or more Third Party Payment Service Providers, on behalf of a Receiving Financial Institution, or a Receiving Portable Computing Device directly to enable "personal cash concentration." This request, provided in either adhoc, automatic or scheduled fashions will include the alias and required password details of the receiving party. In this method, funds owned by the Receiving party will be transferred to the Receiving Party's transaction account. This function or feature may be characterized as a "Bring it Home" feature/function relative to the Receiving Party's account at the financial institution.

In all scenarios, the method and system may further include the Payment Switch Module verifying a selected transfer option against one or more risk thresholds. The risk thresholds may include at least one of a threshold assigned to a sender; a threshold assigned to a receiver; and a threshold assigned to a financial institution.

BRIEF DESCRIPTION OF THE DRAWINGS

In the Figures, like reference numerals refer to like parts throughout the various views unless otherwise indicated. For reference numerals with letter character designations such as "100A" or "100B", the letter character designations may differentiate two like parts or elements present in the same Figure. Letter character designations for reference numerals may be omitted when it is intended that a reference numeral to encompass all parts having the same reference numeral in all figures

FIG. 5 illustrates a continuation flowchart of the method of FIGS. 4A-4B for processing a member financial institution customer payor to a member financial institution customer payee;

FIG. 6 illustrates a continuation flowchart of the method of FIGS. 4A-4B for processing a member financial institution customer payor to a member financial institution customer payee;

FIG. 7 illustrates a continuation flowchart of the method of FIGS. 4A-4B for processing a member financial institution customer payor to a member financial institution customer payee;

FIG. 8A illustrates a separate flowchart of a method for checking on payments that have expired for lack of acceptance by a receiver;

FIG. 8B illustrates a separate flowchart of a method for retrieving payments that have expired for lack of acceptance by a receiver;

FIG. 9A illustrates a continuation flowchart of a method 400E of FIGS. 4A-4B for processing a member financial institution customer payor to a member financial institution customer payee;

FIG. 15A is an exemplary screen display for a portable computing device that lists person-to-person payment parameters that may be selected by a sender;

FIG. 15B is an exemplary screen display for a portable computing device that lists receivers that may be selected by a sender;

FIG. 15C is an exemplary screen display for a portable computing device that lists velocity payment options that may be selected by a sender;

DETAILED DESCRIPTION

The word "exemplary" is used herein to mean "serving as an example, instance, or illustration." Any aspect described herein as "exemplary" is not necessarily to be construed as exclusive, preferred or advantageous over other aspects.

Figure 1A:
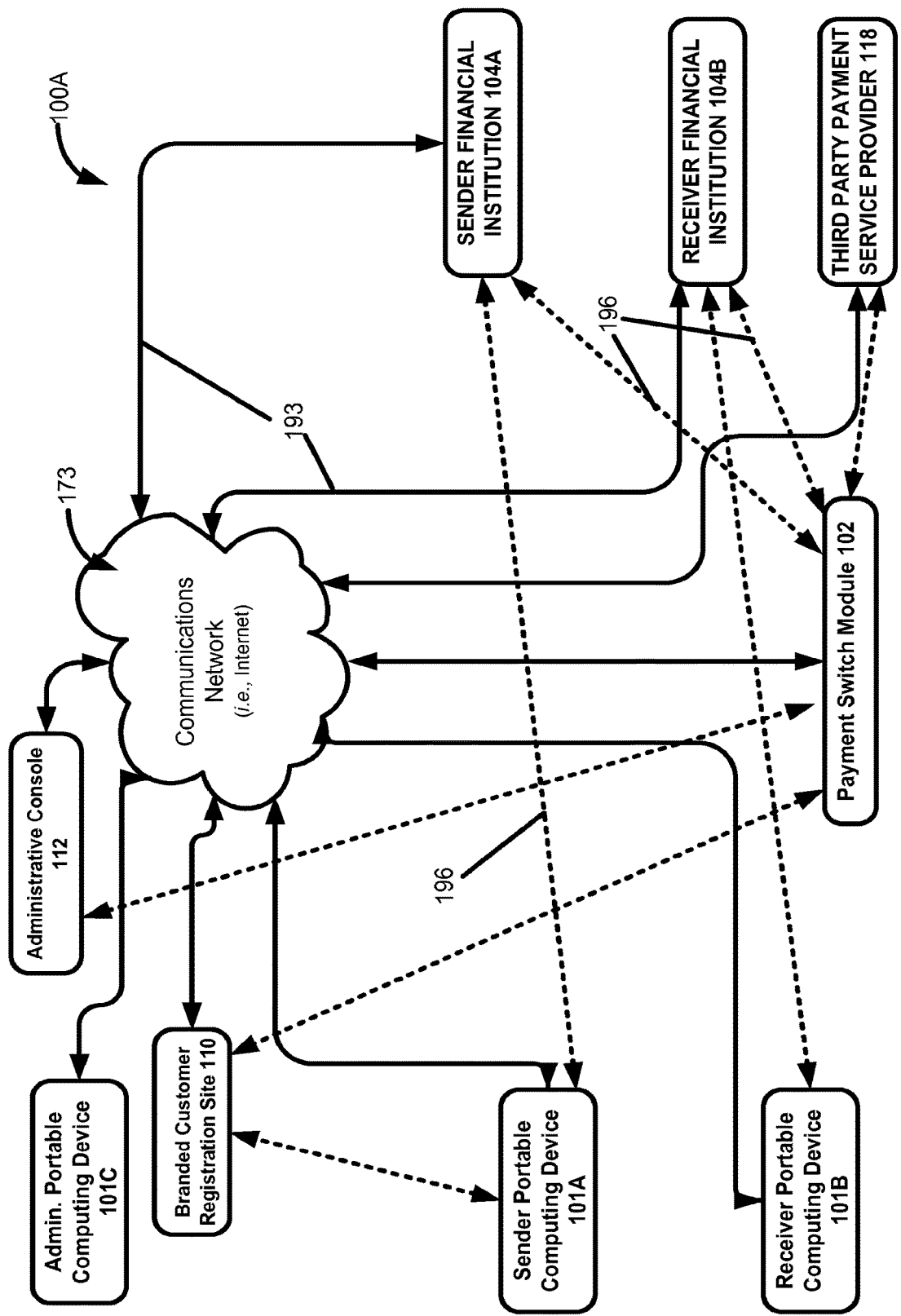
FIG. 1A is a diagram of a system for managing person-to-person payments in conjunction with one or more financial institutions and/or third party payment service providers.

Referring now to FIG. 1A, this figure is diagram of a system 100A for managing person-to-person payments in conjunction with one or more financial institutions 104 and/or third party payment service providers 118. The system 100A may comprise a payment switch module 102 which may be coupled to a communications network 173 that may comprise a wide area network ("WAN"), a local area network ("LAN"), the Internet, or a combination of networks. The payment switch module 102 may be coupled to financial institutions ("FIs") 104, and third party payment service providers 118.

Through the network 173, the payment switch module 102 may also communicate with an administrative console module 112 and a branded customer registration web site supported by a server 110. Meanwhile, the financial institutions may communicate with portable computing devices 101 operated by their customers. The portable computing devices ("PCDs") 101 may take on many different forms such as desktop computers, laptop computers, tablet personal computers ("PCs"), handheld devices such as personal digital assistance ("PDAs"), in addition to other smart devices such as smartphones and cellular telephones. Any device which may access the network 173, whether directly or via a tether to a complimentary device may be characterized as a PCD 101.

The PCDs 101 as well as the payment switch module 102 along with the financial institutions 104 and third party payment service providers 118 may be coupled to the network 173 by various types of communication links 193. These communication links 193 may comprise wired as well as wireless links. The communication links 193 allow each of the devices to establish direct, virtual links 196 among one another.

A sender portable computing device 101A is generally a PCD that is used by a payor to make a person-to-person payment to a payee. The payor in the system 100 may also be generally referred to as a "sender" in this written description. Meanwhile, the payee or recipient of a person-to-person payment may generally include a receiver portable computing device 101B. The payee in the system 100 may also be generally referred to as a "receiver" in this written description.

A sender's financial institution 104A may generally comprise a bank or other type of financial services provider which has one or more accounts associated with the sender who is the operator of the sender portable computing device 101A. The sender in a person-to-person payment may generally request the sender's financial institution ("FI") 104A to transfer money from an account associated with the sender to an account that exists within a receiver's financial institution 104B and that is associated with the receiver.

Alternatively, the sender in a person-to-person payment may generally request the sender's financial institution 104A transfer money from an account associated with the sender within a third-party payment service provider 118 and/or within the sender's financial institution 104A to an account associated with a receiver that may exist within a third-party payment service provider 118. A third-party payment service provider 118 may comprise an entity that manages nontraditional accounts such as those managed by PAYPAL™ and AMAZON™ payments known as of this writing. However, the third-party payment service provider 118 may support an account which includes, but is not limited to, any type of accounts that store value.

For example, other exemplary third-party payment service entities 118 may include, but are not limited to, mobile phone service providers, airline accounts that have frequent flier points/miles, music accounts with value, etc. The payment switch module 102 may communicate with the third-party payment service entities 118 via Simple Object Access Protocol ("SOAP")/Hypertext Transfer Protocol ("HTTPS") protocols as understood by one of ordinary skill in the art.

Other non-traditional accounts outside of traditional financial accounts managed by third-party payment service providers 118 may comprise, but are not limited to, reward or membership accounts that manage points, travel miles, gift cards, stored value, and other similar measures of value. The system 100 is not limited to any types of specific accounts and may transfer value between a first account having a first measure of value to a second account having a second measure of value, in which the payment switch module 102 may assist in converting units of the first measure value to the units of the second measure of value.

In this way, the system 100 may support person-to-person payments in which a sender may transfer value from a first account having a first measure of value, such as an airline miles, to a second account associated with a receiver and in which the second account has a second measure of value such as in currency, like U.S. dollars.

As may be described in more detail below, the payment switch module 102 may comprise hardware and/or software for completing person-to-person payments between the sender portable computing device 101A operated by the sender and the receiver portable computing device 101B operated by the receiver. Generally, for a sender to initiate a person-to-person payment using the sender's financial institution 104A, the sender needs to first establish a person-to-person payment account with the sender's financial institution 104A. Similarly, if a receiver desires to receive a person-to-person payment using the receiver's financial institution 104B, then the receiver needs to first establish a person-to-person payment account with the second financial institution 104B.

Meanwhile, the sender's financial institution 104A and the receiver's financial institution 104B in order to support person-to-person payments between the sender and the receiver operating their respective portable computing devices 101 generally need to be members of and/or subscribe to the network created by the payment switch module 102. The sender's and receiver's financial institutions 104A,B may select options and set preferences that are supported by the payment switch module 102 by utilizing an administrative console module 112 that is coupled to the payment switch module 102. Each sender's and receiver's financial institution 104A,B may access the administrative console module 112 through using respective administrative portable computing devices 101C.

The sender and receiver may establish their respective person-to-person payment accounts with their respective financial institutions 104 by using their respective portable computing devices 101 to access branded customer registration websites 110 that may be supported by and/or coupled to the payment switch module 102. These branded customer registration websites 110, while supported by the payment switch module 102, may be under the control of each respective financial institution 104.

One advantage of the system 100 is that transfers of value in a person-to-person payment transaction may occur almost instantaneously from the perspective of the sender and receiver, such as on the order of minutes or even seconds, and depending upon the approvals needed for the transaction from the sender and the receiver operating their respective portable computing devices 101A, 101B. As discussed above, in conventional technology, person-to-person payments in the form of ACH bank transfers and/or personal checks may take at least one or more business days to complete.

One ideal scenario solved by the solution presented by the system 100 includes one in which a sender desires to transfer an amount of money from a the sender's banking account to a receiver's banking account associated with the receiver. The receiver's banking account is maintained by the receiver's financial institution 104B, which is different from the sender's financial institution 104A.

With system 100, this transfer of money between the sender and receiver having banking accounts in the sender's and receiver's financial institutions 104A, 104B may occur within minutes. This immediacy of the transfer in value may occur because sender's financial institution 104A may immediately pull funds from the senders account while the receiver's financial institution 104B may immediately deposit funds (taken from a general ledger account at the receiver's financial institution 104B and place them) into the receiver's account based on a contractual obligation of the sender's financial institution 104A to pay the receiver's financial institution 104B at the close of business or at another designated time as determined between the sender's financial institution 104A and the receiver's financial institution 104B.

Figure 1B:
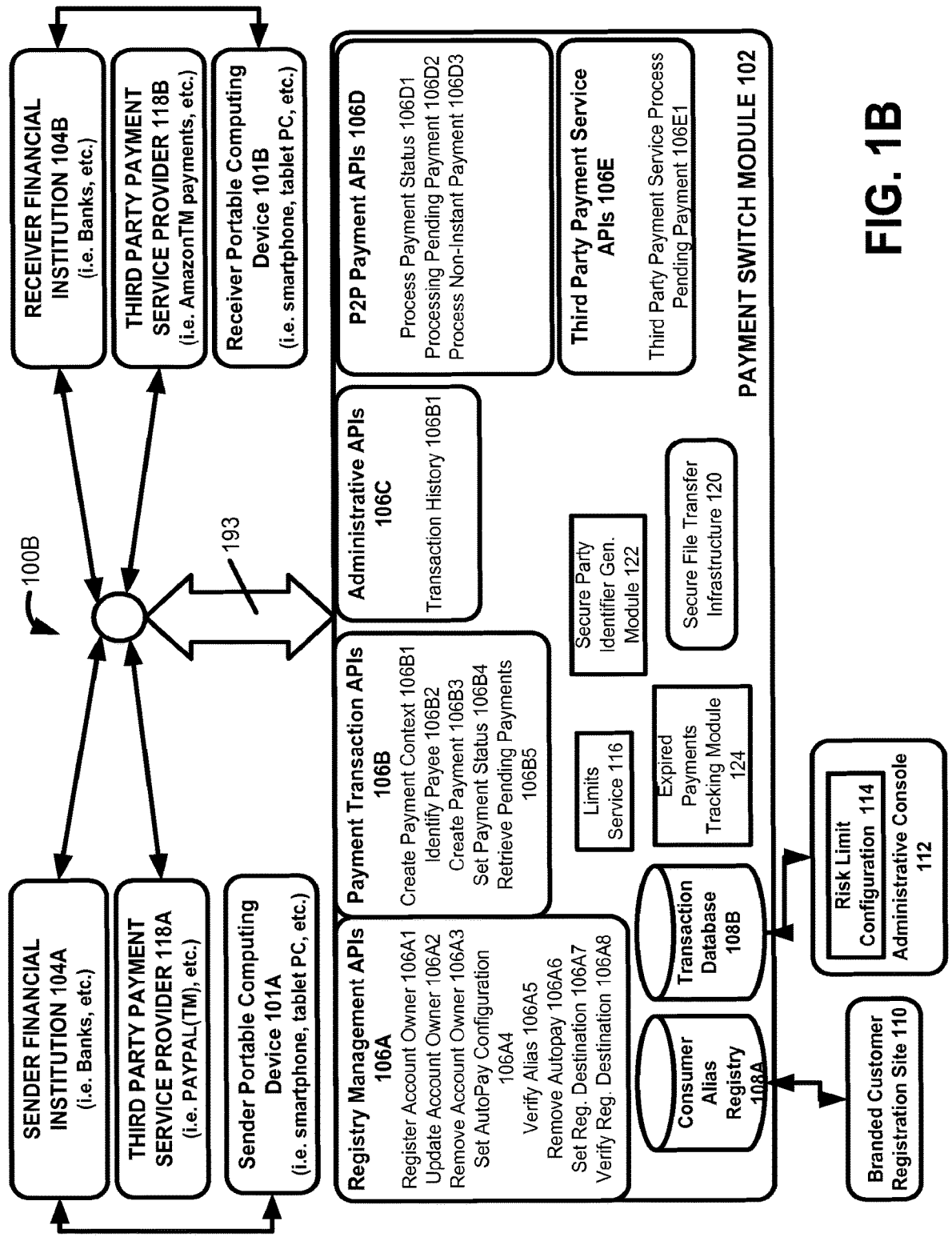
FIG. 1B illustrates the person-to-person payment system of FIG. 1A in more detail.

Referring now to FIG. 1B, this figure illustrates the person-to-person payment system 100 of FIG. 1A in more detail. As illustrated in both FIGS. 1A-1B, the payment switch module 102 is coupled to one or more financial institutions 104, one or more third party payment providers 118, an administrative console module 112, and the registration website 110. Each financial institution 104 may be coupled to one or more portable computing devices ("PCDs") 101 that are operated by the financial institution's customers, which include senders and receivers in person-to-person transactions.

The payment switch module 102 may comprise one or more Application Programming Interfaces ("APIs") 106, a consumer alias registry database 108A, and a transaction database 108B. The APIs may include, but are not limited to, registry management APIs 106A, payment transaction APIs 106B, administrative APIs 106C, person-to-person ("P2P") payment APIs 106D, third party payment service APIs 106E, as well as future risk management APIs and analytics APIs.

These APIs 106 allow the payment switch module 102 to communicate with various financial institutions 104 and third-party payment service entities 118. Each financial institution 104 may have its own, unique core banking computer platform. These core banking platforms may be unique with respect to computer languages, structure, style, format, etc., as understood by one of ordinary skill the art.

The payment switch module 102 may comprise off-the-shelf software such as sold by CLEAR2PAY sold, as of this writing, under the brand name OPEN PAYMENT FRAMEWORK™. Independent of any off-the-shelf software, the payment switch module 102 may receive and manage P2P payments by interacting with the consumer alias registry database 108A and the transaction database 108B.

Some exemplary functions of the payment switch module 102 include, but are not limited to, providing notifications to financial institutions 104 of pending person-to-person payments; tracking whether a P2P payment has been received, accepted and/or rejected; and generating and passing messages relating to person-to-person transactions between financial institutions. The payment switch module 102 generally defines the payload or the content of the messages that are exchanged between two or more financial institutions 104 in connection with a person-to-person transaction.

The consumer alias registry 108A maintained by the payment switch module 102 may track the senders and receivers of person-to-person transactions who are registered with respect to financial institutions 104. Account information as well as identifying information such as names and phone numbers may be associated with an alias. As of this writing, the alias of a sender or a receiver may comprise a mobile phone number or an e-mail address. However, the system 100 is not limited to these two forms of aliases. Other aliases may be used without departing from the scope of the system 100 as understood by one of ordinary skill in the art.

The consumer alias registry database 108A maps each consumer alias to one or more financial institutions 104 or third-party payment service entities 118 in which a particular consumer may have an account. The consumer alias registry database 108A helps the payment switch module 102 to route payments to appropriate consumers who are part of a P2P transaction.

The transaction database 108B also maintained by the payment switch module 102 maintains a detailed running log of P2P transactions. This running log may include, but is not limited to, information such as whether a transaction is pending and/or complete, account information associated with the P2P transaction, and aliases associated with a P2P transaction. Data from the transaction database 108B may be used to create that settlement files or analytical derivatives that are exchanged between the payment switch module 102 and a financial institution 104 over a secure file transfer infrastructure 120 as understood by one of ordinary skill the art.

The transaction database 108B may assist in managing the status of a payment and it may record the history of all payments that are processed through/by the payment switch 102. The transaction database 108B allows each financial institution 104 to resolve disputes over transactions as well as permitting their consumers to view payments that they have made using the payment switch 102.

Both databases 108 may comprise sequential query language ("SQL") databases 108 sold by vendors such as the company of Oracle as understood by one of ordinary skill in the art. Both databases 108 may be generally characterized as relational databases as understood by one of ordinary skill in the art.

The payment switch module 102 may further comprise a limits service module 116 that works in combination with a risk limit configuration module 114. The risk limit configuration module 114 may be part of an administrative console module 112 described in further detail below. The limits service module 116 tracks the limits established and/or set by the risk limit configuration module 114 described below. Every P2P transaction that is passed through the payment switch module 102 is usually checked or verified by the limits service module 116.

The payment switch module 102 may further comprise a secure party identifier generation module 122 which produces a unique identifier based on an alias that was matched from the consumer alias registry database 108A. The secure party identifier generation module 122 is coupled to the consumer alias registry 108A. The secure party identifier generation module 122 pulls its data from the consumer alias registry 108A.

According to one exemplary embodiment, a secure party identifier may comprise the last four characters of the receiver's last name and the first three characters of the receiver's first name that are listed in the consumer alias registry 108A. However, other types of data besides the name of the receiver may be utilized without departing from the scope of this disclosure as understood by one of ordinary skill the art. For example, characters for the secure party identifier may be retrieved from e-mail addresses, mobile telephone numbers, mailing addresses, etc.

One exemplary intent of the secure party identifier may include allowing the sender to confirm the identity of the intended receiver so that the sender may correct a selection of a wrong receiver in an early stage of a P2P transaction before it is completed. The secure party identifier usually should contain enough information so that the sender may easily recognize the intended receiver while protecting the privacy of an unintended receiver. See FIG. 15D described below which illustrates one exemplary embodiment of a secure party identifier 1512.

The payment switch module 102 may also comprise an expired payments tracking module 124. The expired payments tracking module 124 corresponds to a time element with respect to a decision block 462 of FIG. 4 (described below) in which a receiver of a payment has failed to log into his receiver financial institution 104B within a predetermined amount of time. This predetermined amount of time may be established by the payment switch 102. Exemplary time limits include, but are not limited to, fourteen calendar days or ten business days, or the like.

The expired payments tracking module 124 conducts searches the transaction database 108B for expired payments. It searches for those payments which have exceeded the time limit established by the payment switch module 102, and more particularly, the operator of the payment switch module 102 who uses the administrative console module 112.

Overview of APIS 106

The APIs 106 illustrated in FIG. 1B that are part of the payment switch module 102 may employ Web Service Description Language (WSDL) and Schemas, however, other programming languages and schemas are well within one of ordinary skill in the art. Integration of FIs 104 with the payment switch module 102 occurs through various sets of standards-based service interface messages. These messages provide all the necessary capabilities to look up a payee by his alias, to initiate a payment, confirm or reject a payment, to provide notification of a pending payment transaction, and provide all financial management information for settlement between members.

The APIs 106 may be based on open industry standards for the construction and deployment of interoperable web services. They may leverage a basic SOAP payload using WSDL defined contracts with extensible mark-up ("XML") schema based data definitions. These standards may be supported by a wide range of development tools on a variety of different platforms.

It is important to note that in order to participate in the process flow of the payment switch module 102, member FIs 104 may usually need to implement a subset of interfaces described below for the payment switch module 102. Having each FI 104 implement these standard messages may allow the payment switch module 102 to facilitate the P2P payment process between the sender's and receiver's financial institutions 104A, 104B; notifying the FIs 104 of pending payments, status updates, rejections, etc. The payment switch module 102 may provide the FIs 104 with the appropriate WSDL and Schema files to facilitate the implementation of these services. Rules governing the participation of member FIs 104 may be outlined in governance agreements signed by each FI 104.

The ISO 20022 standard is a methodology that is used to develop standard financial business models and messages to facilitate the exchange of information between financial institutions 104. It provides a business process catalogue and data dictionary to standardize both the message syntax and semantics for a wide breadth of financial transactions. While ISO 20022 does include flows for typical consumer to merchant payment processes, it does not specifically address person to person ("P2P) payments. Nor does it currently contain the necessary references and data elements to represent the unique exchange of funds enabled by payment switch module payment flows described below. This gap in the current standard is further reinforced by the fact that third party financial services companies, such as PAYPAL™, have created proprietary flows and schemas in this space.

The inventors recognized this gap in the current set of ISO 20022 standards. To the extent possible, the payment switch module 102 has adopted the current ISO 20022 payment standards while recognizing that the person-to-person process flows and associated data elements described below may be provided as new additions.

The real time services supported and required by the payment switch module 102 have been grouped into three initial categories as defined below: (1) payment Transactions—Handles the sending, routing, and receiving of payments between two parties; (2) Registry Management—Handles the management of the consumer alias registry data and autopay settings; (3) Administration—Provides historical data and configuration management capabilities.

Additional API sets may be defined and expanded upon based on the ones disclosed herein in order to accommodate future needs and requirements. Table 1 listed below summarizes the operations within these categories listed above:

TABLE 1

APIs 106 OPERATION SUMMARY

| Operation | Description |
| --- | --- |
| Create payment Context | Establishes a transaction specific, single use security token for a payment transaction |
| Identify Payee | Lookup the Receiver's registered destination information and their associated Secure Party Identifier (SPI) within the Alias Registry database 108A |

TABLE 1-continued

APIs 106 OPERATION SUMMARY

| Operation | Description |
|---|---|
| Create payment | Creates a payment within the payment switch module 102 and analyzes the transaction against configured risk limits |
| Set payment Status | Marks a pending payment as completed (if accepted by the Receiver) or cancelled (if rejected by Receiver) |
| Retrieve Pending payments | Allows a Member FI 104 to retrieve any payments that are pending for a given Receiver |
| Process payment Status | Notifies the Sender's FI 104A of the payments status: Sent, Accepted, Rejected, etc. |
| Process Pending payment | Notifies the Receiver's FI 104B that a payment is pending |
| Process NonInstant payment | Notifies the Sender's FI 104A that they need to handle a non-instant payment, likely via an ACH transaction, to distribute the payment to the Receiver's account |

TABLE 2

REGISTRY MANAGEMENT APIS 106A OPERATION SUMMARY LIST

| Operation | Description |
|---|---|
| Register Account Owner | Stores customer alias and FI information within the Consumer alias registry 108A |
| Update Account Owner | Modifies the account owner alias information for a given FI |
| Remove Account Owner | Sets an account owner alias as inactive if they close their accounts with a given FI 104. The account owner history may be retained |
| Verify Alias | Used to confirm that a customer has possession of an alias. |
| Set AutoPay Configuration | Adds an autopay configuration to the Consumer alias registry 108A when the receiver configures it for the given sender |
| Remove AutoPay Configuration | Remove the autopay configuration associated with a given sender |
| Set Registered Destination FI 104 | Sets an FI 104 as the registered/default payment destination |
| Verify Registered Destination FI | Response to the Member FI 104 to notify them if they are the current registered destination for a customer |

TABLE 3

ADMINISTRATION OPERATION APIS 106C1 SUMMARY LIST

| Operation | Description |
|---|---|
| Retrieve Transaction History | Retrieves the set of historical transactions within the given time period supplied. |

Net Settlement Reporting

The inter-day and end-of-day net settlement reports may be generated and provided at predefined intervals agreed upon by the member financial institutions 104. These reports may be made available via standard secure file transfer protocols ("SFTP") (infrastructure) 120 over a defined network path, i.e. SFTP or equivalent file transfer as understood by one of ordinary skill in the art. Member FIs 104A may have separate and distinct file directories and all access may be restricted to those locations based on strict user entitlements.

A web interface for intra-day settlement reporting, risk configuration and transaction research may also be provided to the Member FIs 104. Detailed descriptions of each operation are provided below.

Table 4 defines the set of potential parties that may be involved in a P2P payment transaction. These definitions map to the corresponding ISO 20022 party terms, but are scoped to the specific context of a P2P payment flow described below in connection with FIGS. 4-14.

TABLE 4

ISO 20022 PARTY TERMS CORRELATION

| Party Term | Synonyms | Definition |
|---|---|---|
| Debtor | Payer, Sender | The party that owns the account that may be used to make the payment; the account from which funds may be debited. |
| Creditor | Payee, Receiver | The party that owns the account that may receive the payment from the Debtor; the account to which funds may be credited. |
| Debtor Agent | Debtors (Senders) Bank/Financial Services Provider | The Financial Institution that holds and services an account for the Debtor; the account from which funds may be debited. |
| Creditor Agent | Creditors (Receivers) Bank/Financial Services Provider | The Financial Institution that holds and services an account for the Creditor; the account to which funds may be credited. |
| Initiating Party | Originator | The party initiating the payment. This |

TABLE 4-continued

ISO 20022 PARTY TERMS CORRELATION

| Party Term | Synonyms | Definition |
| --- | --- | --- |
| Intermediary Agent | Intermediary | may be the Debtor or a party that initiates the payment on behalf of the Debtor. A financial services provider; or servicing organization that sits in-between the Debtor and Creditor Agents and processes or facilitates the payment between these entities. |

The following outlines the business and financial management functions that the payment switch module 102 expects the Member FIs 104 to own and be responsible for: (a) Posting and General Ledger activities; (b) End-of-day inter-bank settlement processing and reconciliation; (c) Risk Management; fraud and anti-money laundering prevention, detection, and resolution; (d) Exception and dispute resolution; and (e) NACHA file generation and submission into the ACH network.

The following outlines the technical capabilities that payment switch module 102 expects the Member FIs 104 to implement, support, and ensure are available in support of the integrated payments switch module 102: (a) Customer experience; all Customer facing channel applications where the FI 104 wishes to expose payments capabilities must be modified to support and enable the desired functionality; (b) Back Office/Agent Assisted user experience: Any agent assisted channel applications in which research, dispute resolution, or registration and payment assistance is desired must be modified to support the necessary functionality; (c) Customer identification and authentication as well as verification of source account ownership and availability of funds; (d) Storage of Customer alias (or associated identifier) to the Account reference data: payment switch module 102 may usually only store a pointer to the FI 104 with which the customer has an account—Account details are maintained by the FIs 104; (e) The implementation of all required payment switch module 102 API's to enable the facilitation of payment transactions between two parties; (f) Core banking platform integration for intraday posting and associated account debit/credit activities; and (g) GL Account funding and money management activities between external third party financial services providers 118; i.e. PAYPAL™.

The following highlights capabilities that the payment switch module 102 may not be provided in first generations but are being considered for inclusion alternate, future exemplary embodiments. Some of the capabilities may be implemented by either the switch module 102 or the member FIs 104. In these cases, the payment switch module 102 may support both options, allowing the FI 104 to decide which solution they may like to leverage.

TABLE 5

ALTERNATE EXEMPLARY EMBODIMENTS OF SWITCH MODULE FUNCTIONS

| Feature | Payment Switch Module 102 | Member FI 104 |
|---|---|---|
| "White List" risk override | Payment switch module 102 may implement an alias or customer id "White List" to allow the FI 104 to automatically override all risk thresholds for executives, high net worth customers, etc. | N/A |
| Automated Risk Exception Overrides | The payment switch module 102 payment API may need to be extended to enable the payment to be resubmitted when the exception is overridden. | Payment switch module 102 may provide a list of exception conditions in the API response, allowing the FI 104 to evaluate the conditions using custom logic or rules. The FI 104 may resubmit the payment if the override occurs. |
| Internal Switch Fraud Case Generation | When a risk threshold is exceeded payment switch module 102 may generate a case that is held within the Switch and accessible via the provided administrative console. The payment itself may be prevented or allowed to continue depending on FI 104 configuration. | N/A |
| Member FI Fraud Case Generation | N/A | Payment switch module 102 may provide a list of exception conditions in the API response, allowing the FI 104 to generate a case within their own Fraud/Risk Management solution. No Case may be generated within payment switch module 102. |
| Manual Risk Overrides | Payment switch module 102 may provide manual override capability of a payment that triggered a risk exception via the provided Administrative console. | If payment switch module 102 is not generating the case, responsibility for the risk override process and user interface falls on the Member FI 104. Similar to the Automated risk overrides, the payment may need to be resubmitted in the event the override occurs. |
| "Black List" payment block | Payment switch module 102 may provide an FI specific black list to block all payments to a specific alias when directed to that FI 104. | Blocking a customer from registering for P2P should be implemented at the FI 104. Payment switch module 102 may provide API's to allow a customer to be unregistered. |
| Risk Scoring Through Behavioral Analysis | By identifying typical usage patterns, payment switch module 102 may score payment transactions that fall outside the usual payment profile for a given customer and provide the score to the Payers FI 104. | FIs may need to determine if they want to process the risk score real time allowing the transaction to be halted or through offline case generation. |
| NACHA File Creation | Payment switch module 102 may generate NACHA files for a Member FI 104 and either provide them back to the FI 104 for submission into the ACH network, or interface with a partner Originating Depository Financial Institution (ODFI) and submit the NACHA file on behalf of the Member FI 104. | N/A |
| Receiver Notification of Pending payment | Customer interaction is currently owned by the Member FI 104, however payment switch module 102 may perform the email or SMS notification to a receiver when a payment is pending if the FI 104 chooses. | N/A |
| Bring-It-Home | By leveraging third party API's | N/A |

TABLE 5-continued

ALTERNATE EXEMPLARY EMBODIMENTS OF SWITCH MODULE FUNCTIONS

| Feature | Payment Switch Module 102 | Member FI 104 |
|---|---|---|
| Candidate Identification | payment switch module 102 may identify customers that maintain significant balances at third party financial service providers. | |
| Additional API Sets | Payment switch module 102 may continue to expand the available API sets to expose additional features and capabilities to the Member FI 104's. | N/A |

The P2P payments API 106D may be accessed by channels established by a Member FI 104. Payment switch module 102 may also invoke services that the FI's 104 implement and host on behalf of the switch module 102. Payment switch module 102 may provide the FIs 104 with WSDL and XSD files that describe the SOAP message structure, its contents, and the appropriate service bindings. Each Member FI 104 may need to ensure that the availability and reliability of the hosted services adhere to the agreed upon network SLAs.

The payment switch module APIs 106 may be based on standard SOAP web services. While the switch module 102 itself may leverage a Java EE platform, the Member FI 104 is open to implement the APIs 106 in any language that supports industry standard SOAP based service specifications.

The API sets 106 are usually compliant with the following industry standard versions, as of this writing: Simple Object Access Protocol (SOAP) version 1.1; Web Service Description Language (WSDL) 1.1; XML Schema 1.0; and WS-I Basic Profile 1.1.

While the message structure of the payments APT sets 106 have been designed to be transport neutral, some exemplary embodiments may only support service invocations using HTTP over SSL per the security guidelines listed below. Other message based protocols may be supported in future releases as understood by one of ordinary skill in the art.

The APIs 106 may leverage both transport level and message level security mechanisms to ensure that each conversation between a Member FI 104 and the payment switch module 102 enables both parties to: determine the identity of the sender; verify the identity of the sender—authenticate them; determine if the sender is authorized to perform the operation requested; transport and receive the message confidentially, so that unauthorized parties cannot view it; verify the integrity of the message, that it has not been intercepted and modified; and ensure non-repudiation, i.e., the sender cannot deny that it participated in the conversation.

Since messaging in the APT sets 106 are bi-directional with the Member FT 104 sending messages to the payment switch module 102 and the payment switch module 102 sending messages to the FI 104, the messaging protocol usually supports bi-directional authentication.

All conversations between the Member FIs 104 and payment switch module usually employ encryption. For maximum security, payment switch module 102 and its partners will exchange public certificates through an out-of-band channel such as hand delivery or other secure transport. Using these certificates, payment switch module 102 and the Member FIs 104 may establish mutual SSL connections for all transactions as understood by one of ordinary skill in the art.

Additionally, both the payment switch module 102 and the Member FIs 104 may digitally sign message payloads using the sender's private certificate key. This layer of security may use a separate set of certificates from the ones used to establish the SSL connection, as understood by one of ordinary skill in the art.

Additionally, since the sender must sign the message using the W3C XML Signature WG standard, the SOAP message will include a Signature header using the sender's private key and only decrypt-able with the sender's public key. This usually guarantees that the message originated from the sender.

In order to mitigate the possibility of replay attacks, payment switch module 102 may also establish a one-time use session token, or nonce, as part of the Create payment Context service. This token will be included in the message by the Member FI 104 on subsequent calls to the switch module 102. Once the token expires, any message submitted using it will be deemed fraudulent.

All API messages may be based on a standard SOAP 1.1 doc-literal message structure as of this writing. Other languages are well within the level of ordinary skill in the art based on this written description. As understood by one of ordinary skill in the art, a SOAP message is composed of a root soap envelope which contains one or more SOAP headers and a SOAP body. The APIs 106 may leverage the SOAP Header to carry identifying information and audit data. As such, payment switch module 102 may define a set of common request and response elements that may be included within the SOAP header structure. The message payload, which will be part of the SOAP body, may vary depending on the individual message call. The response elements to the APIs 106 may share common response elements as described above. With each table provided below for each response APT 106, in addition to the common response elements which may be shared as understood by one of ordinary skill in the art, the tables generally provide parameters which are outputs to responses.

Each service request may contain the following set of common elements as provided by Table 6:

TABLE 6

SERVICE REQUEST ELEMENTS

| Parameter | Description | Type | Cardinality | Req |
|---|---|---|---|---|
| CreationDateTime | The precise date and time that a message is sent by the client system. It is based upon UTC with precision to the millisecond | DateTime | 1 | Y |
| MessageIdentification | An ID that uniquely identifies the message. This field will help uniquely identify each message for debug and logging purposes | String | 1 | Y |
| ClientConversationID | A unique ID that can be used to tie several independent messages together as part of a broader client interaction. | String | 0 . . . 1 | N |
| OriginatingOrganization | Identifies the FI 104 originating the message | Organization Identification Type | 0 . . . 1 | Y |

Each service response may contain the following set of common elements listed in Table 7:

TABLE 7

SERVICE RESPONSE COMMON ELEMENTS

| Parameter | Description | Type | Cardinality | Required |
|---|---|---|---|---|
| CreationDateTime | The precise date and time that a message is sent by the client system. It is based upon UTC with precision to the millisecond | DateTime | 1 | Y |
| MessageIdentification | An ID that uniquely identifies the message. This field will help uniquely identify each message for debug and logging purposes | String | 1 | Y |
| CorrelationID | This contains the MessageID that was sent with the corresponding request. | String | 1 | Y |
| ClientConversationID | This echo's the ClientConversationID that was provided on the corresponding request. | String | 0 . . . 1 | N |
| StatusCode | A message level status indicating the success or failure of the message | String | 1 | Y |
| ResponseCodeList | A list of associated response codes. Can be used to provide a list of informational messages or a set of exception conditions. | Array of ResponseCode elements | 0 . . . 1 | N |
| ResponseCode | A code that represents informational, warning, or error conditions within the service execution. | ResponseCodeType | 0 . . . n | N |

Tables 8-12 list some data types that may be supported by the payment switch module:

TABLE 8

Alias Code Types - may Represent a customer's alias

| Parameter | Description | Type | Cardinality | Required |
|---|---|---|---|---|
| AliasType | The Type of alias | String | 1 | Y |

TABLE 8-continued

Alias Code Types - may Represent a customer's alias

| Parameter | Description | Type | Cardinality | Required |
|---|---|---|---|---|
| AliasValue | value The value of the alias type | String | 1 | Y |

TABLE 9

Risk Exception Types - may Represent a risk limit exception

| Parameter | Description | Type | Cardinality | Required |
|---|---|---|---|---|
| LimitCode | The risk limit that was triggered | String | 1 | Y |
| LimitDescription | Description of the condition that triggered the exception. | String | 1 | Y |
| RiskDetailArray | An array of parameters that define the amount or time exceeded and the threshold. This will be specific to the risk thresholds. | Array of Name Value Pairs | 0 . . . 1 | N |

TABLE 10

Person Types - may represent an individual consumer; either acting as the Debtor or Creditor in a payment transaction.

| Parameter | Description | Type | Cardinality | Required |
|---|---|---|---|---|
| FirstName | The Customer's first name. | String | 0 . . . 1* | N |
| LastName | The Customer's last name. | String | 0 . . . 1* | N |
| CustomerFIPartyID | A unique customer identifier supplied and managed by a Member FI 104. The Member FI 104 must retain this field and ensure that it is unique and associated with the appropriate customer. | String | 0 . . . 1* | N |
| PPCustomerID | A Unique ID established within the Consumer alias registry 108A that identifies the associated Customer. | String | 0 . . . 1* | N |

*Cardinality will vary based on the individual requirements of each operation that leverages the PersonType

TABLE 11

Organization Identification Type

| Parameter | Description | Type | Cardinality | Required |
|---|---|---|---|---|
| BICOrBEI | The BIC code of the Payee's FI 104 | String | 1 | Y |

TABLE 12

Payment Type - may Represent a payment transaction

| Parameter | Description | Type | Cardinality | Required |
|---|---|---|---|---|
| paymentTransactionID | A Unique ID established within the payment switch module 102 to identify a specific payment transaction. | String | 1 | Y |
| Amount | The Amount of the payment | String | 1 | Y |
| Debtor | Represents the customer making the payment; the Debtor or Payer. | PersonType | 1 | Y |
| paymentTimeStamp | Timestamp when the payment was submitted/created | Date | 1 | Y |

TABLE 13

Response Code Types - may Represent an error or warning

| Parameter | Description | Type | Cardinality | Required |
|---|---|---|---|---|
| Code | A code representing the individual error or warning condition. | String | 1 | Y |
| Description | Short description of the condition | String | 1 | Y |
| Severity | Describes the severity of this specific response code. | String | 1 | Y |
| Source | The system component or application where the error occurred | String | 0 . . . 1 | N |
| TechnicalDetails | Additional technical details that may be logged to provide support level debug assistance. | String | 0 . . . 1 | N |

While each individual service operation may have a set of response codes specific to that function, the following sets may be common across all conversations between the switch module 102 and a FI 104. Default text is provided in the <Description> field, which is intended to be human-readable. The FI 104 may return this default text to the customer, or may replace it with custom text that is more specific or translated into the appropriate language.

TABLE 14

Status Code Values

| Code | Description |
|---|---|
| Success | Success. The message processed successfully |
| Warn | Warning. The message processed but with warnings. Some or all of the functionality expected was not executed. Refer to the ResponseCodeList for a detailed list of the warning conditions. |
| Error | Error. The message failed to be processed. Refer to the ResponseCodeList for a detailed list of the error conditions. |

TABLE 15

Response Code Values
This Table 14 is an initial list of common response codes, additional response codes will be documented within each service call.

| Code | Severity | Description | Condition |
|---|---|---|---|
| 100 | Error | General Error | There was an error that prevented the service provider from processing the transaction. No additional information is provided. |
| 200 | Error | Invalid Request Element | One or more of the elements in the request is either invalid or is inconsistent with other elements. |
| 1000 | Error | Authentication Failed | The FI 104 credentials could not be verified |
| 1010 | Error | Invalid Token | The security token provided has expired or is invalid |

The payment transaction API set 106B implements the core processing functions of the payments switch module 102. It provides services to facilitate the sending, routing, and receiving of payments between two parties. Some functions within this API set 106B may be required implementations for each Member FI 104. In order to accommodate the implementation of different functions between the switch module 102 and the Member FIs 104, two different service objects will usually be created.

The payment service implements the core set of operations of the payment switch module 102. These functions will be invoked by the Member FIs 104 according to the recommended integration guidelines.

Table 16 provides an Operation Summary List for the payment transaction API set 106B:

TABLE 16

Operation Summary List
Functions:

Create payment Context
Identify Payee
Create payment
Set payment Status
Retrieve Pending payments The create payment context API 106B1 may establish a transaction specific, one-time use security token that will be included as part of each message exchange between the switch module 102 and a Member FI 104. One-time use refers to the fact that the token will usually be specific to a single payment creation flow. The token has a short life span in order to mitigate the possibility of replay attacks.

TABLE 17

Exemplary request elements for Create Payment context API 106B1

| Parameter | Description | Type | Cardinality | Required |
|---|---|---|---|---|
| Debtor | Represents the customer making the payment; the Sender or Payer. | PersonType | 1 | Y |

TABLE 18

Exemplary Exemplary response elements for Create Payment context API 106B1

| Parameter | Description | Type | Cardinality | Required |
|---|---|---|---|---|
| SecureToken | A secure transaction token with an expiration time of 15 minutes. See the Section on Security for more information on the usage of this token. It will also be used by subsequent requests to identify the sender. | String | 1 | Y |

The Identify Payee API 106B2 includes a lookup of the receiver's registered destination information and their associated Secure Party Identifier (SPI) within the payment switch module 102 payments Alias Registry database 108A as will be described below. If the alias is not found within the registry database 108A, an informational message is returned with a limited set of velocity options. An unidentified payee is a valid response for this operation.

TABLE 19

Exemplary request elements for Identify Payee API 106B2

| Parameter | Description | Type | Cardinality | Required |
|---|---|---|---|---|
| AliasCode | The Alias that will be used to look up the receiver. | AliasCode Type | 1 | Y |

TABLE 20

Exemplary response elements for Identify Payee API 106B2

| Parameter | Description | Type | Cardinality | Required |
|---|---|---|---|---|
| PPCustomerID | A Unique ID established within the Consumer alias registry 108A that identifies the associated receiver. | String | 0 . . . 1 | N |
| CreditorSPI | The Creditors (Receivers) Secure Party Identifier. | String | 0 . . . 1 | N |
| VelocityOptionList | A list of available velocity options for this Receiver. | Array of Strings | 1 | Y |

The Create payment function will be used by the Sender's Member FI 104 to create a payment transaction within the payment switch module 102 and to trigger the risk threshold analysis.

TABLE 21

Exemplary request elements for Create Payment API 106B3

| Parameter | Description | Type | Cardinality | Required |
|---|---|---|---|---|
| Debtor | Represents the customer making the payment; the Sender or Payee. | PersonType | 1 | Y |
| Creditor | Represents the receiver of the payment; the Payee. Required if the CreditorAliasCode is not present. | PersonType | 0...1 | N* |
| CreditorAliasCode | The Alias of the receiver. Required if the Creditor element is not present. | AliasCodeType | 0...1 | N* |
| Amount | The amount of the payment. | String | 1 | Y |
| SecureToken | The secure transaction token established in the CreatepaymentContext call. If the token has expired, this operation will fail. | String | 1 | Y |
| VelocityCode | The selected payment velocity code, chosen from the Velocity Option List returned in the Identify Payee call. | String | 1 | Y |
| SourceAccountID | A pointer or correlation ID, to the source account from which the payment funds are being debited. It could be the last four digits of the account number, or some hash value identifier associated with the account. This is an optional field that the Member FI 104 can choose to leverage if they do not wish to retain the transaction data themselves. | String | 0...1 | N |

In addition to the common response elements, the following parameters are outputs to this operation of the Create Payment API 106B3.

TABLE 22

Exemplary response elements for Create Payment API 106B3

| Parameter | Description | Type | Cardinality | Required |
|---|---|---|---|---|
| paymentTransactionID | A Unique ID established within the payment switch module 102 to identify a specific payment transaction. | String | 1 | Y |
| paymentStatusCode | The status of the payment transaction | String | 1 | Y |
| RiskLimitExceptionList | A list of exceptions triggered by the risk limit engine within the Switch | Array of RiskLimitException elements | 0...1 | N |
| RiskLimitException | An exception triggered by the risk limit engine. | RiskExceptionType | 0...n | N |

The Set Payment Status API 106B4 is used to notify the payment switch module 102 of a change in the state in a payment transaction, i.e. when it is confirmed, accepted, rejected, or expires. This operation also triggers any necessary downstream processing based on the status applied.

TABLE 23

Exemplary request elements for the Set Payment Status API 106B4

| Parameter | Description | Type | Cardinality | Required |
|---|---|---|---|---|
| paymentTransactionID | A Unique ID established within the payment switch module 102 to identify a specific payment transaction. | String | 1 | Y |
| paymentStatusCode | The status of the payment transaction. | String | 1 | Y |

According to one exemplary embodiment, there are no additional response elements returned beyond the outputs listed in the Common Response Elements described above for the Set Payment Status API 106B4.

The Retrieve Pending payments API 106B5 allows an FI 104 to query and retrieve any outstanding payments for a given receiver.

TABLE 24

Exemplary request elements for the Retrieve Pending Payments API 106B5

| Parameter | Description | Type | Cardinality | Required |
|---|---|---|---|---|
| CustomerFIPartyID | A unique customer identifier supplied and managed by a Member FI 104. This is the same identifier that was supplied to the Switch when the customer was registered. | String | 1 | Y |

TABLE 25

Exemplary response elements for the Retrieve Pending Payments API 106B5

| Parameter | Description | Type | Cardinality | Required |
|---|---|---|---|---|
| paymentList | A list of payments that are in a pending state. | Array of payment elements | 1 | Y |
| payment | A payment transaction. | paymentType | 0 ... n | N |

The P2P Payments APIs 106D include the subset of operations that the Member FIs 104 usually must implement and expose to participate in the payment exchange. The P2P Payment APIs 106D may include, but are not limited to, the following three APIs 106D: a process payment status API 106D1, a process pending payment API 106D2, and a process noninstant payment API 106D3.

The Process payment status API 106D1 may be implemented by each Member FI 104 and is invoked by the payment switch module 102 to notify the Sender's FI 104 of a change in payment status.

TABLE 26

Exemplary request elements for Process Payment Status API 106D1

| Parameter | Description | Type | Cardinality | Required |
|---|---|---|---|---|
| paymentTransactionID | A Unique ID established within the payment switch module 102 to identify a specific payment transaction. | String | 1 | Y |
| paymentStatusCode | The status of the payment | String | 1 | Y |

TABLE 26-continued

Exemplary request elements for Process Payment Status API 106D1

| Parameter | Description | Type | Cardinality | Required |
|---|---|---|---|---|
| Debtor | transaction. Represents the customer making the payment; the Sender or Payee. | PersonType | 1 | Y |
| Amount | The amount of the payment. | String | 1 | Y |
| SourceAccountID | A pointer or correlation ID, to the source account from which the payment funds are being debited. It could be the last four digits of the account number, or some hash value identifier associated with the account. This is an optional field that the Member FI 104 can choose to leverage if they do not wish to retain the transaction data themselves. | String | 0 . . . 1 | N |

According to one exemplary embodiment, there are no additional response elements returned beyond the outputs listed in the Common Response Elements described above for the Process Payment Status API 106D1.

The Process pending payment API 106D2 may be implemented and exposed by each Member FI 104 and will be invoked by the payment switch module 102 in order to notify a Receiver's FI 104 that a payment is pending.

TABLE 27

Exemplary request elements for Process Pending Payment Status API 106D2

| Parameter | Description | Type | Cardinality | Required |
|---|---|---|---|---|
| paymentTransactionID | A Unique ID established within the payment switch module 102 to identify a specific payment transaction. | String | 1 | Y |
| Debtor | Represents the customer making the payment; the Sender or Payee. | PersonType | 1 | Y |
| Creditor | Represents the receiver of the payment; the Payee. | PersonType | 1 | Y |
| Amount | The amount of the payment. | String | 1 | Y |
| DebtorsOrganization | A Code assigned to each Member FI 104 that is part of the payment switch module 102 payments Network. | Organization Identification Type | 1 | Y |
| DestinationAccountID | A pointer, or correlationID, to the destination account which will be credited with the payment. This Is optional and will be returned if set through the AutoPay configuration. | String | 0 . . . 1 | N |

According to one exemplary embodiment, there are no additional response elements returned beyond the outputs listed in the Common Response Elements described above for the Process Pending Payment Status API 106D2.

The Process NonInstant payment API 106D3 notifies the Member FI 104 that the Receiver has registered their account information and accepted the pending non-instant payment. The FI 104 will usually need to generate a transaction in their daily ACH batch for processing.

The Register Account Owner API 106A1 may add a Customer and their associated alias and FI 104 information to the alias registry database 108A of the payment switch module 102.

TABLE 28

Exemplary request elements for NonInstant payment API 106D3

| Parameter | Description | Type | Cardinality | Required |
| --- | --- | --- | --- | --- |
| paymentTransactionID | A Unique ID established within the payment switch module 102 to identify a specific payment transaction. | String | 1 | Y |
| Amount | The amount of the payment. | String | 1 | Y |
| Debtor | Represents the customer making the payment; the Sender or Payee. | PersonType | 1 | Y |
| SourceAccountID | A pointer, or correlation ID, to the source account from which the payment funds are being debited. This is an optional field that the Member FI 104 can choose to leverage if they do not wish to retain the transaction data themselves. | String | 0 . . . 1 | N |
| Creditor | Represents the receiver of the payment; the Payee. | PersonType | 1 | Y |
| CreditorsAccountNumber | The full account number of the destination account. | String | 1 | Y |
| CreditorsRoutingNumber | The RTN of the Receiver's destination FI 104. | String | 1 | Y |

According to one exemplary embodiment, there are no additional response elements returned beyond the outputs listed in the Common Response Elements described above for the for NonInstant payment API 106D3.

The Registry Management APIs 106A provide the Member FIs 104 with a means to maintain the data contained within the consumer alias registry. This includes account owner registration and Create, Read, Update, and Delete (CRUD) capabilities as well as the AutoPay and registered destination management functions.

The following Registry Management APIs 106A include five according to one exemplary embodiment. The five APIs 106A may include but are not limited to, a register account owner API 106A1, an update account owner API 106A2, a remove account owner API 106A 106A3, a set autopay configuration AIP 106A4, and a verify alias API 106A5.

TABLE 29

Exemplary request elements for the register account owner API 106A1

| Parameter | Description | Type | Cardinality | Required |
| --- | --- | --- | --- | --- |
| AliasCodeList | List of Alias Codes associated with this customer. | Array of AliasCode elements | 1 | Y |
| AliasCode | An alias code. | AliasCodeType | 1 . . . n | Y |
| AccountOwner | Represents the customer being registered. | PersonType | 1 | Y |

TABLE 30

Exemplary response elements for the register account owner API 106A1

| Parameter | Description | Type | Cardinality | Required |
|---|---|---|---|---|
| ConfirmationCode | A unique code that is associated with an update to the payment switch module 102 and can be logged and referenced by the client within support tickets or during transaction research. | String | 0 . . . 1 | N |

The update account owner API 106A2 may update the Customer alias and/or FI information within the alias registry 108A of the payment switch module 102.

TABLE 31

Exemplary request elements for the update account owner API 106A2

| Parameter | Description | Type | Cardinality | Required |
|---|---|---|---|---|
| AliasCodeList | List of Alias Codes associated with this customer. | Array of AliasCode elements | 1 | Y |
| AliasCode | An alias code. | AliasCodeType | 1 . . . n | Y |
| AccountOwner | Represents the customer being registered. | PersonType | 1 | Y |

TABLE 32

Exemplary response elements for update account owner API 106A2

| Parameter | Description | Type | Cardinality | Required |
|---|---|---|---|---|
| ConfirmationCode | A unique code that is associated with an update to the payment switch module 102 and can be logged and referenced by the client within support tickets or during transaction research. | String | 0 . . . 1 | N |

The Remove Account Owner API 106A3 may indicate that a Customer is no longer having a relationship with a FI 104. This will prevent future payments from being sent to the FI 104 for that Customer.

TABLE 33

Exemplary request elements for Remove Account Owner API 106A3

| Parameter | Description | Type | Cardinality | Required |
|---|---|---|---|---|
| CustomerFIPartyID | The Customer's unique FI party ID. This is the same identifier that was supplied in the Register Account Owner call. | String | 1 | Y |

TABLE 34

Exemplary response elements for Remove Account Owner API 106A3

| Parameter | Description | Type | Cardinality | Required |
|---|---|---|---|---|
| ConfirmationCode | A unique code that is associated with an update to the payment switch module 102 and can be logged and referenced by the client within support tickets or during transaction research. | String | 0 . . . 1 | N |

The verify alias AP 106A5 may compare an alias verification code entered by a customer against a previously generated value to determine if the two entries match. A match indicates that the customer has provided evidence of their possession of the alias.

TABLE 35

Exemplary request elements for Verify Alias API 106A5

| Parameter | Description | Type | Cardinality | Required |
|---|---|---|---|---|
| CustomerFIPartyID | The Customer's unique FI party ID. This is the same identifier that was supplied in the Register Account Owner call. | String | 1 | Y |
| AliasCode | The alias code being verified | AliasCodeType | 1 | Y |
| VerificationCode | The alias verification code entered by the customer | String | 1 | Y |

TABLE 36

Exemplary response elements for Verify Alias API 106A5

| Parameter | Description | Type | Cardinality | Required |
|---|---|---|---|---|
| ConfirmationCode | A unique code that is associated with an update to the payment switch module 102 and can be logged and referenced by the client within support tickets or during transaction research. | String | 0 . . . 1 | N |

The Set Autopay Configuration API 106A4 may store an association between the Receiver and Sender to automatically accept payments from the Sender when routed to the FI 104 specified. According to one exemplary embodiment, usually, only a single configuration may exist per Sender-Receiver-FI association.

TABLE 37

Exemplary request elements for Set Autopay Configuration API 106A4

| Parameter | Description | Type | Cardinality | Required |
|---|---|---|---|---|
| CustomerFIPartyID | The Receiver's unique FI party ID. This is the same identifier that was supplied in the Register Account Owner call. | String | 1 | Y |
| PPCustomerID | The payment switch module 102 payments ID representing the Sender of the payment. | String | 1 | Y |
| DestinationAccountID | A pointer, or correlationID, to the destination account which will be credited with the payment. | String | 0 . . . 1 | N |

TABLE 38

Exemplary response elements for Set Autopay Configuration API 106A4

| Parameter | Description | Type | Cardinality | Required |
|---|---|---|---|---|
| ConfirmationCode | A unique code that is associated with an update to the payment switch module 102 and can be logged and referenced by the client within support tickets or during transaction research. | String | 0 . . . 1 | N |

The remove autopay configuration API 106A6 may remove an association between the Receiver and Sender set as part of the Set AutoPay Configuration call.

TABLE 39

Exemplary request elements for remove autopay configuration API 106A6

| Parameter | Description | Type | Cardinality | Required |
|---|---|---|---|---|
| CustomerFIPartyID | The Receiver's unique FI party ID. This is the same identifier that was supplied in the Register Account Owner call. | String | 1 | Y |
| PPCustomerID | The payment switch module 102 payments ID representing the Sender of the payment. | String | 1 | Y |

TABLE 40

Exemplary response elements for remove autopay configuration API 106A6

| Parameter | Description | Type | Cardinality | Required |
|---|---|---|---|---|
| ConfirmationCode | A unique code that is associated with an update to the payment switch module 102 and can be logged and referenced by the client within support tickets or during transaction research. | String | 0 . . . 1 | N |

The Set Registered Destination API 106A7 may set the Member FI 104 supplied as the registered, or default, destination for all future payments sent to the Receiver. According to one exemplary embodiment, usually there can only be one registered destination per receiver alias.

TABLE 41

Exemplary request elements for the Set Registered Destination API 106A7

| Parameter | Description | Type | Cardinality | Required |
|---|---|---|---|---|
| CustomerFIPartyID | The Customer's unique FI party ID. This is the same identifier that was supplied in the Register Account Owner call. | String | 1 | Y |

TABLE 42

Exemplary response elements for the Set Registered Destination API 106A7

| Parameter | Description | Type | Cardinality | Required |
|---|---|---|---|---|
| ConfirmationCode | A unique code that | String | 0 . . . 1 | N |

TABLE 42-continued

Exemplary response elements for the
Set Registered Destination API 106A7

| Parameter | Description | Type | Cardi-nality | Re-quired |
|---|---|---|---|---|
| | is associated with an update to the payment switch module 102 and can be logged and referenced by the client within support tickets or during transaction research. | | | |

A Verify Registered Destination API 106A8 may allow a Member FI 104 to determine if they are the current registered destination for a given Customer. According to one exemplary embodiment, it does not return the FI 104 that is registered; rather it only allows an FI 104 to determine if an FI 104 is the registered destination.

TABLE 43

Exemplary request elements for Verify
Registered Destination API 106A8

| Parameter | Description | Type | Cardi-nality | Re-quired |
|---|---|---|---|---|
| CustomerFIPartyID | The Customer's unique FI party ID. This is the same identifier that was supplied in the Register Account Owner call. | String | 1 | Y |

TABLE 44

Exemplary response elements for Verify
Registered Destination API 106A8

| Parameter | Description | Type | Cardi-nality | Re-quired |
|---|---|---|---|---|
| RegistrationFlag | Returns true if the FI 104 is the registered destination, else false. | Boolean | 1 | Y |

Referring again to FIG. 1B, the branded registration website module 110 may comprise a computer server operated by a respective financial institution 104 which allows consumers of the respective financial institution to register in order to receive person-to-person payments via the payment switch module 102. The system 100 may comprise a plurality of registration websites 110 that are operated independently of one another by each respective financial institution 104. Each registration website module 110 may support a micro deposit verification function when new accounts are established by a consumer of a particular financial institution 104 or a similar verification technique as understood by one of ordinary skill in the art.

The administrative console module 112 may comprise a computer server running software and/or hardware associated with the payment switch module 102. It allows the operator of the payment switch module 102 to assist financial institutions 104 with verifying registration of consumers and for setting risk limit configurations that may be individually or specifically tailored by each financial institution 104.

The administrative console module 112 generally supports administrative functions for one or more operators of the payment switch module 102. For example, the administrative console module 112 may permit financial institutions to conduct lookups for aliases within the transaction database 108B or within the consumer alias registry database 108A. The administrator console module 112 may also allow the operator to establish credentials for permitting financial institutions 104 to access various functions enter features of the administrative console module 112.

The administrative console module 112 may further comprise a risk limit configuration module 114 that supports the risk limit configurations described above. The risk limit configuration module 114 may comprise software and/or hardware. The risk limit configuration module 114 may allow each financial institution 104 to set individual or consumer based limits on person-to-person transactions. According to one exemplary embodiment, the risk limit configuration module 114 may be set so that it limits the number of person-to-person transactions that a particular consumer may make within a certain period of time.

For example, the risk limit configuration module 114 may allow a financial institution 104 to restrict the number and/or the amount of person-to-person transactions that occur for a particular consumer within a 24-hour window. A financial institution 104 may restrict a particular consumer to no more than five person-to-person transactions totaling $10,000 or less within a 24-hour window. Of course, other more restrictive or less restrictive limits that address the transaction amount, time frames, and/or frequency may be employed without departing from the scope of this disclosure as understood by one of ordinary skill in the art.

The risk limit configuration module 114 may also set limits on a network basis that restricts the number and amount of person-to-person transactions for a respective financial institution 104. For example, the risk limit configuration module 114 may restrict a first financial institution 104 to $1,000,000 per day for all transactions managed by the payment switch module 102. Of course, other more restrictive or less restrictive limits that address the transaction amount, time frames, and/or frequency per each financial institution 104 may be employed without departing from the scope of this disclosure as understood by one of ordinary skill in the art.

If a consumer happens to have several accounts with different financial institutions 104, the risk limit configuration module 114 may also limit the total amount of funds transferred from and/or to the consumer as an aggregate level monitor. For example, the risk limit configuration module 114 may limit the consumer to $10,000 per day across all financial institutions 104 in which the particular consumer may have an account. Other types of restrictions not expressly defined, such as a combination of these restrictions, may be employed without departing from the spirit and scope of this disclosure. The risk limit configuration module 114 is designed to substantially reduce or substantially eliminate the chance that fraudulent transactions may occur within and/or across the system 100.

The payment switch module 102 may also comprise a secure file transfer infrastructure module 120 which is supported by each respective financial institution 104. The secure file transfer infrastructure module 120 for each financial institution 104 supports a batch transfer data. A batch transfer data may be contained in a single file at the end of each business day. This single file may contain each financial institutions single net settlement reporting due for a respective business day. This single file informs each financial institution 104 of the amount and destinations for money that is owed to other financial institutions 104 that are members and who are coupled to the payment switch module 102.

Figure 2:
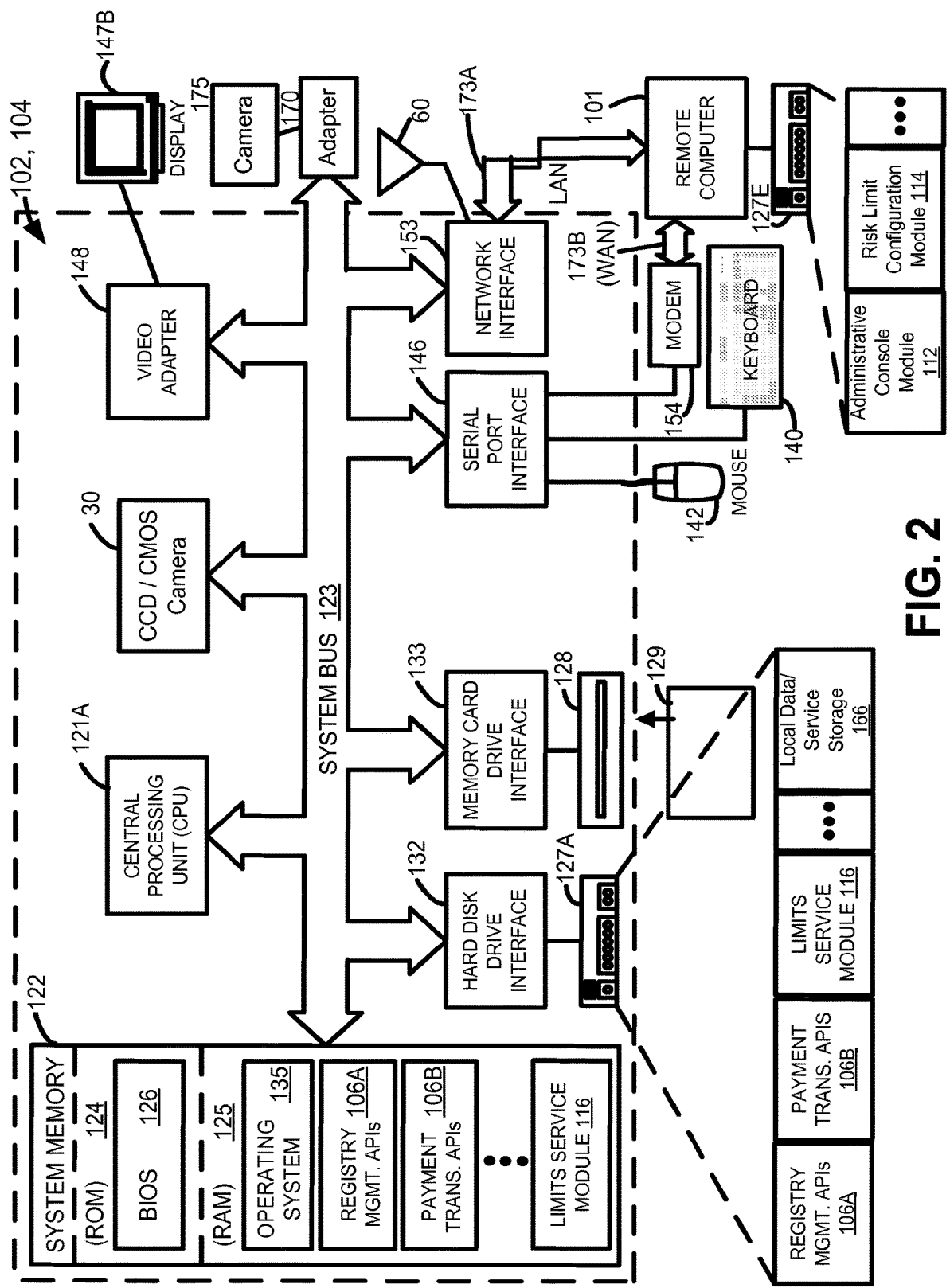
FIG. 2 is a functional block diagram of a payment switch module and/or a financial institution server embodied as a general purpose computer.

Referring now to FIG. 2, this figure is a functional block diagram of a payment switch module 102 and/or a financial institution server 104 embodied as a general purpose computer. The exemplary operating environment for the system 100 includes a general-purpose computing device in the form of a conventional computer.

Generally, a computer 102, 104 includes a central processing unit 121, a system memory 122, and a system bus 123 that couples various system components including the system memory 122 to the processing unit 121.

The system bus 123 may be any of several types of bus structures including a memory bus or memory controller, a peripheral bus, and a local bus using any of a variety of bus architectures. The system memory includes a read-only memory (ROM) 124 and a random access memory (RAM) 125. A basic input/output system (BIOS) 126, containing the basic routines that help to transfer information between elements within computer 102, such as during start-up, is stored in ROM 124.

The computer 102, 104 may include a hard disk drive 127A for reading from and writing to a hard disk, not shown, a memory card drive 128 for reading from or writing to a removable memory card 129, and/or an optional optical disk drive (not illustrated) for reading from or writing to a removable optical disk (not illustrated) such as a CD-ROM or other optical media. Hard disk drive 127A and the memory card drive 128 are connected to system bus 123 by a hard disk drive interface 132 and a memory card drive interface 133, respectively.

Although the exemplary environment described herein employs hard disk 127A and the removable memory card 129, it should be appreciated by one of ordinary skill in the art that other types of computer readable media which may store data that is accessible by a computer, such as magnetic cassettes, flash memory cards, digital video disks, Bernoulli cartridges, RAMs, ROMs, and the like, may also be used in the exemplary operating environment without departing from the scope of the invention. Such uses of other forms of computer readable media besides the hardware illustrated may be used in internet connected devices such as in portable computing devices ("PCDs") 101 that may include personal digital assistants ("PDAs"), mobile phones, tablet portable computing devices, and the like.

The drives and their associated computer readable media illustrated in FIG. 2 provide nonvolatile storage of computer-executable instructions, data structures, program modules, and other data for computer 102, 104. A number of program modules may be stored on hard disk 127, magnetic disk 129, optical disk 131, ROM 124, or RAM 125, including, but not limited to, an operating system 135 and switch module 5. Program modules include routines, sub-routines, programs, objects, components, data structures, etc., which perform particular tasks or implement particular abstract data types.

A user may enter commands and information into computer 1 through input devices, such as a keyboard 140 and a pointing device 142. Pointing devices may include a mouse, a trackball, and an electronic pen that may be used in conjunction with a tablet portable computing device. Other input devices (not shown) may include a microphone, joystick, game pad, satellite dish, scanner, or the like. These and other input devices are often connected to processing unit 121 through a serial port interface 146 that is coupled to the system bus 123, but may be connected by other interfaces, such as a parallel port, game port, a universal serial bus (USB), or the like.

The display 147 may also be connected to system bus 123 via an interface, such as a video adapter 148. The display 147 may comprise any type of display devices such as a liquid crystal display (LCD), a plasma display, an organic light-emitting diode (OLED) display, and a cathode ray tube (CRT) display.

A camera 175 may also be connected to system bus 123 via an interface, such as an adapter 170. The camera 175 may comprise a video camera such as a webcam. The camera 175 may be a CCD (charge-coupled device) camera or a CMOS (complementary metal-oxide-semiconductor) camera. In addition to the monitor 147 and camera 175, the computer 102, 104 may include other peripheral output devices (not shown), such as speakers and printers.

The computer 102, 104 may operate in a networked environment using logical connections to one or more remote computers 101, 110, such as a web server 110 as illustrated in FIG. 1A. A remote computer 101, 110 may be another personal computer, a server, a mobile phone, a router, a network PC, a peer device, or other common network node. While the web server 110 or a remote computer 101 typically includes many or all of the elements described above relative to the client device, only a memory storage device 127E has been illustrated in FIG. 2. The logical connections depicted in the FIG. 2 include a local area network (LAN) 173A and a wide area network (WAN) 173B. Such networking environments are commonplace in offices, enterprise-wide computer networks, intranets, and the Internet.

When used in a LAN networking environment, the computer 102, 104 is often connected to the local area network 173A through a network interface or adapter 153. The network interface adapter 153 may comprise a wireless communications and therefore, it may employ an antenna 60. When used in a WAN networking environment, the computer 102, 104 typically includes a modem 154 or other means for establishing communications over WAN 173B, such as the Internet. Modem 154, which may be internal or external, is connected to system bus 123 via serial port interface 146.

In a networked environment, program modules depicted relative to the remote computer 101, or portions thereof, may be stored in the remote memory storage device 127E. It may be appreciated that the network connections shown are exemplary and other means of establishing a communications link between the computers 101, 102, 104.

Moreover, those skilled in the art may appreciate that the present invention may be implemented in other computer system configurations, including hand-held devices, multi-processor systems, microprocessor based or programmable consumer electronics, network personal computers, mini-computers, mainframe computers, and the like. The invention may also be practiced in distributed computing environments, where tasks are performed by remote processing devices that are linked through a communications network. In a distributed computing environment, program modules may be located in both local and remote memory storage devices.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Figure 3:
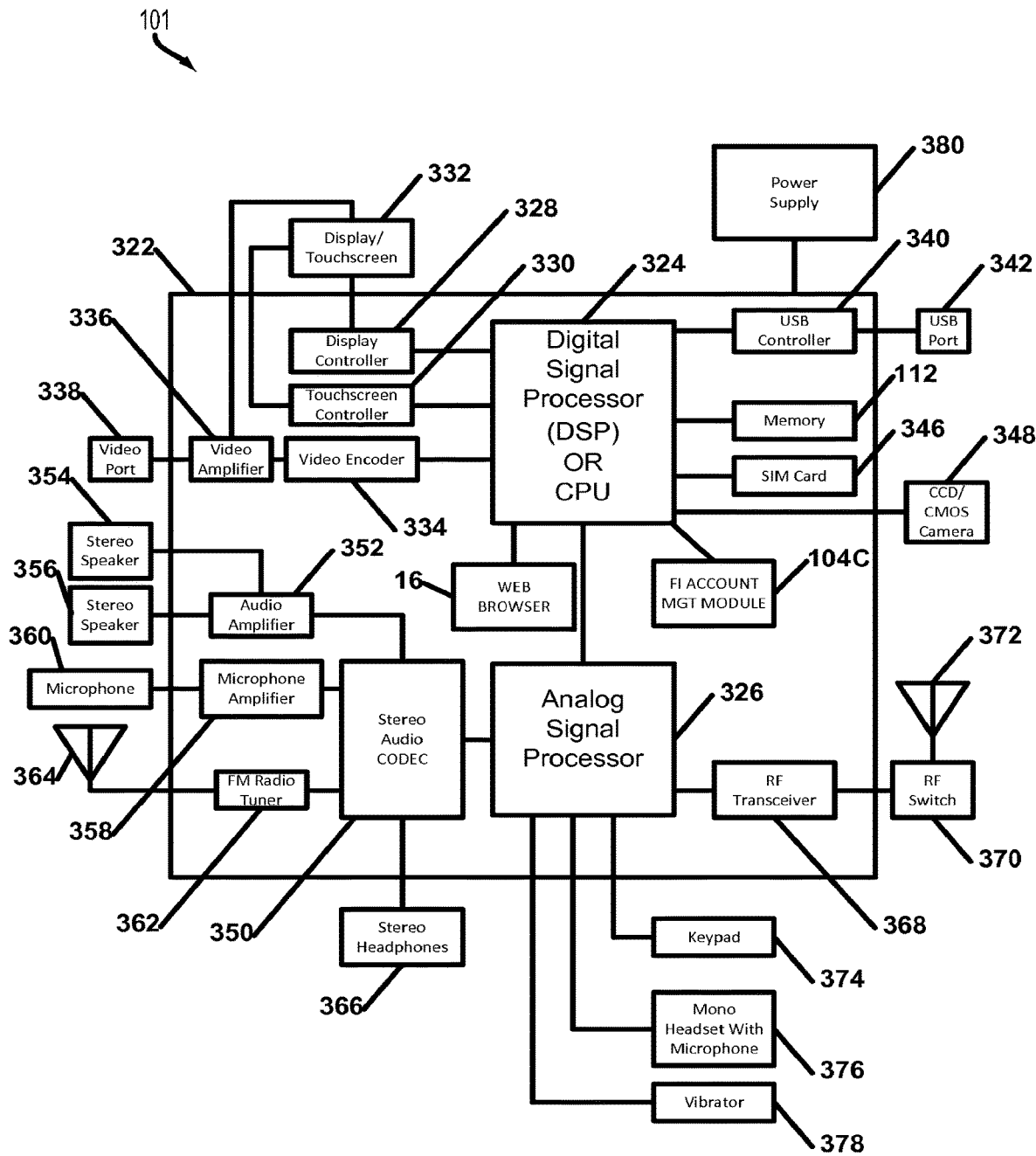
FIG. 3 is a diagram of an exemplary, non-limiting aspect of a portable computing device ("PCD") comprising a wireless mobile telephone or tablet portable computer ("PC") which corresponds with the portable computing devices illustrated in FIGS. 1A-1B.

Referring to FIG. 3, this figure is a diagram of an exemplary, non-limiting aspect of a portable computing device ("PCD") 101 comprising a wireless mobile telephone which corresponds with the portable computing devices 101 illustrated in FIGS. 1A-1B. As shown, the PCD 101 includes an on-chip system 322 that includes a digital signal processor or a central processing unit 324 and an analog signal processor 326 that are coupled together.

As illustrated in FIG. 3, a display controller 328 and a touchscreen controller 330 are coupled to the digital signal processor 324. A touchscreen display 332 external to the on-chip system 322 is coupled to the display controller 328 and the touchscreen controller 330.

FIG. 3 further illustrates a video encoder 334, e.g., a phase-alternating line ("PAL") encoder, a sequential couleur avec memoire ("SECAM") encoder, a national television system(s) committee ("NTSC") encoder or any other video encoder, is coupled to the digital signal processor 324. Further, a video amplifier 336 is coupled to the video encoder 334 and the touchscreen display 332. A video port 338 is coupled to the video amplifier 336. As depicted in FIG. 3, a universal serial bus ("USB") controller 340 is coupled to the digital signal processor 324. Also, a USB port 342 is coupled to the USB controller 340. A memory 112 and a subscriber identity module ("SIM") card 346 may also be coupled to the digital signal processor 324.

Further, as shown in FIG. 3, a digital camera 348 may be coupled to the digital signal processor 324. In an exemplary aspect, the digital camera 348 is a charge-coupled device ("CCD") camera or a complementary metal-oxide semiconductor ("CMOS") camera.

As further illustrated in FIG. 3, a stereo audio CODEC 350 may be coupled to the analog signal processor 326. Moreover, an audio amplifier 352 may be coupled to the stereo audio CODEC 350. In an exemplary aspect, a first stereo speaker 354 and a second stereo speaker 356 are coupled to the audio amplifier 352. FIG. 3 shows that a microphone amplifier 358 may be also coupled to the stereo audio CODEC 350.

Additionally, a microphone 360 may be coupled to the microphone amplifier 358. In a particular aspect, a frequency modulation ("FM") radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 3 further illustrates a radio frequency ("RF") transceiver 368 that may be coupled to the analog signal processor 326. An RF switch 370 may be coupled to the RF transceiver 368 and an RF antenna 372. The RF transceiver 368 may communicate with conventional communications networks as well as with global positioning system ("GPS") satellites in order to obtain GPS signals for geographical coordinates.

As shown in FIG. 3, a keypad 374 may be coupled to the analog signal processor 326. Also, a mono headset with a microphone 376 may be coupled to the analog signal processor 326. Further, a vibrator device 378 may be coupled to the analog signal processor 326. FIG. 3 also shows that a power supply 380 may be coupled to the on-chip system 322. In a particular aspect, the power supply 380 is a direct current ("DC") power supply that provides power to the various components of the PCD 101 that require power. Further, in a particular aspect, the power supply is a rechargeable DC battery or a DC power supply that is derived from an alternating current ("AC") to DC transformer that is connected to an AC power source.

FIG. 3 also shows that PCD 101 may include a financial institution ("FI") management module 104C in addition to a web browser. The web browser 16 and/or FI management module 104C may comprise software that is used to communicate with branded customer registration website 110 and financial institutions 104 of FIG. 1A.

As depicted in FIG. 3, the touchscreen display 332, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 are external to the on-chip system 322.

Figure 4A:
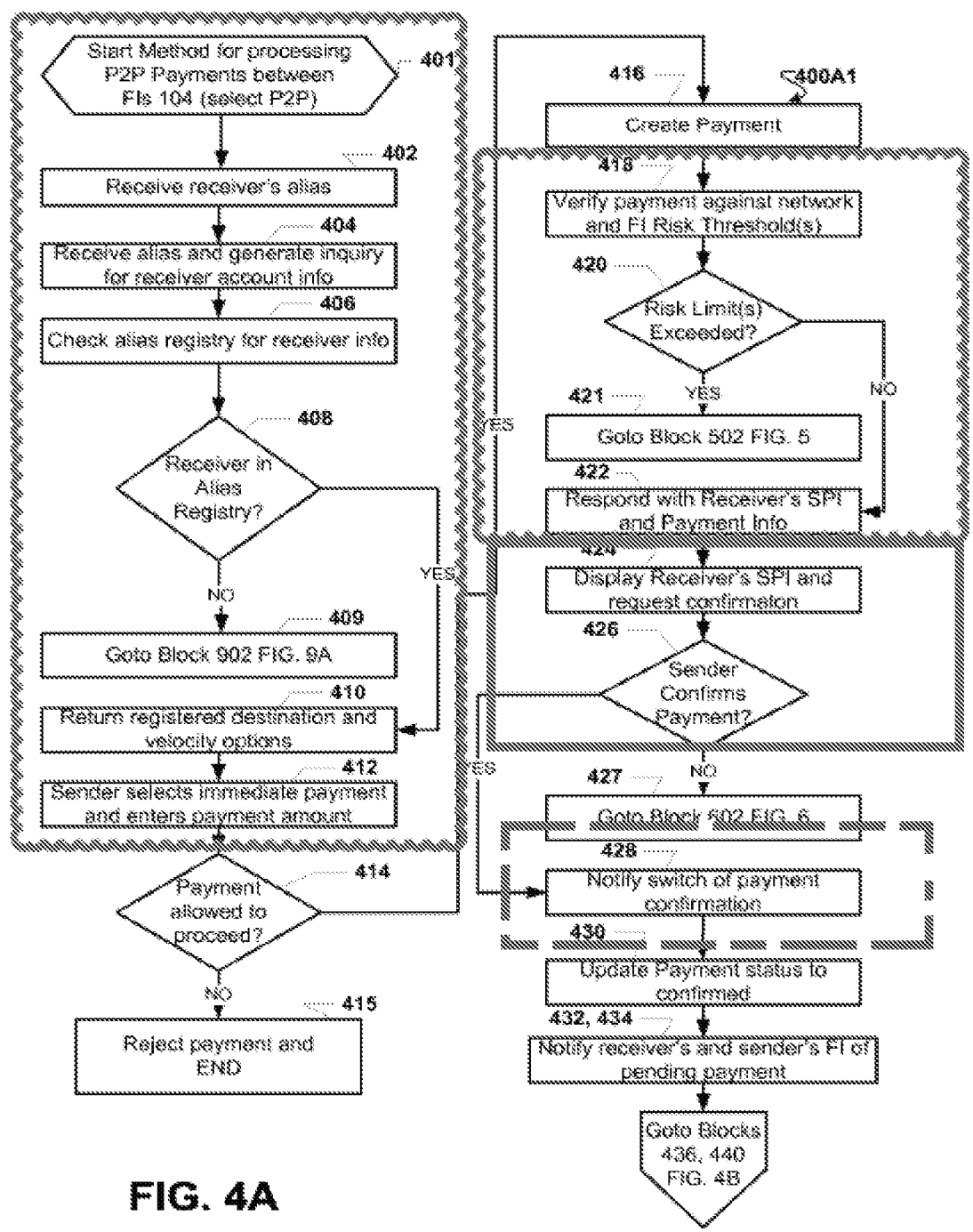
FIGS. 4A-4B illustrate a flowchart of a method for processing a member financial institution customer payor to a member financial institution customer payee.
Figure 4B:
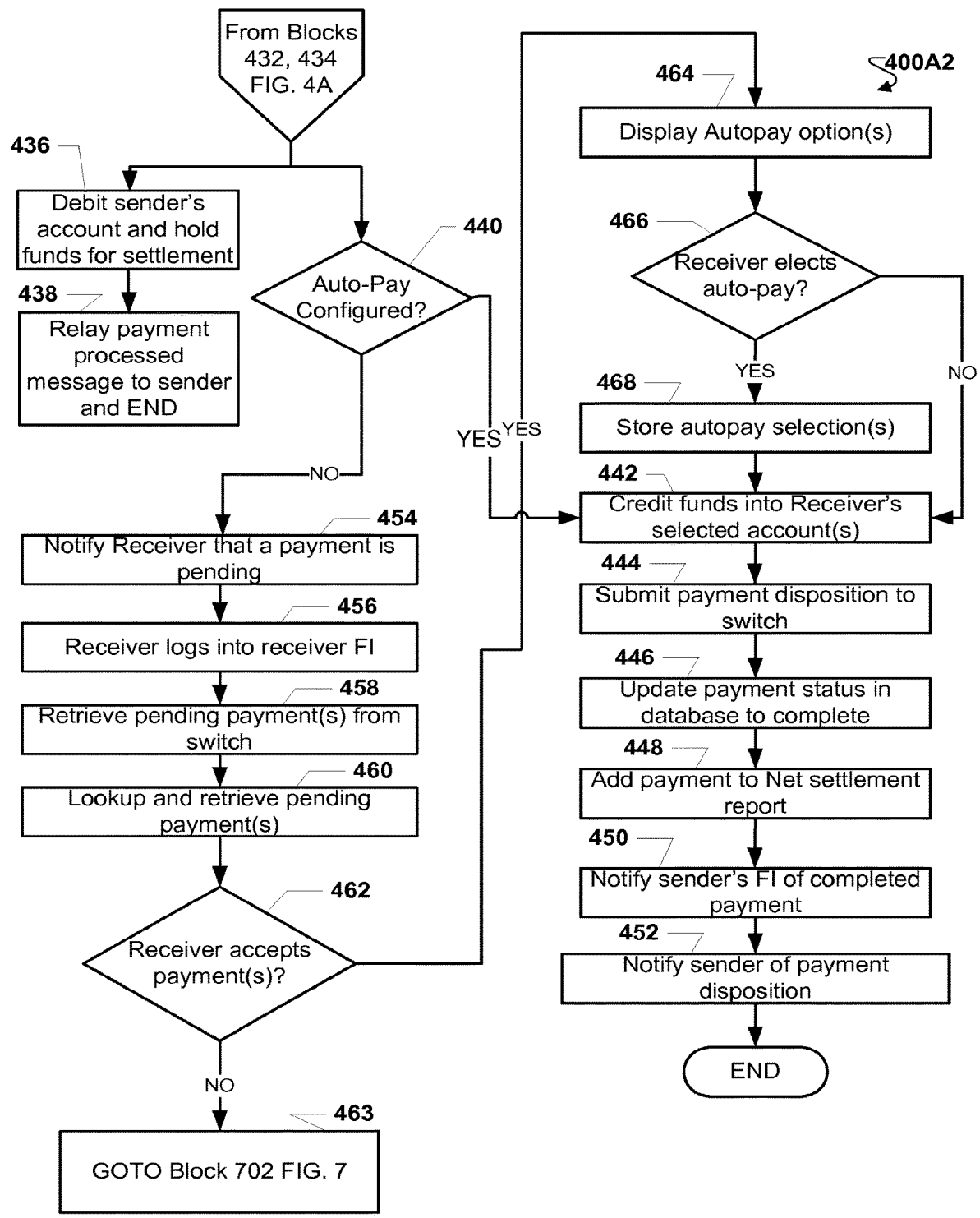

FIGS. 4A-4B illustrate a flowchart of a method 400A-B for processing a member financial institution customer payor to a member financial institution customer payee. To simplify the discussion, a member financial institution customer payor who operates a portable computing device 101 for sending a payment will be referred to as a sender in the method 400A and in subsequent flowcharts. Similarly, a member financial institution customer payee who will also operate a portable computing device 101 for receiving payment will be referenced as the receiver a method 400A.

In a particular aspect, one or more of the method steps described herein (such as illustrated in FIGS. 4A-4B) may be stored in the memory 112 as computer program instructions. These instructions may be executed by the digital signal processor or central processing unit 324, the analog signal processor 326, or another processor, to perform the methods described herein. Further, the processors, 324, 326, the memory 112, the instructions stored therein, or a combination thereof may serve as a means for performing one or more of the method steps described herein.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the figures which may illustrate various process flows.

Referring back to FIG. 4A, block 401 is the first step in method 400A. In block 401, the sender initiates a person-to-person payment using a portable computing device 101 such as illustrated in FIG. 15A. As discussed above, the portable computing device 101 is not limited to a mobile phone and may include other devices, such as, but not limited to, a personal digital assistant, a pager, a smartphone, a tablet portable computing device, a navigation device, and a hand-held or personal computer with a wireless connection or link.

Next, in block 402, a receiver's alias is received with the portable computing device 101, such as illustrated in FIG. 15B described in detail below. The receiver's alias may comprise an e-mail address and/or a mobile phone number of the receiver (who will be receiving the payment). However, other aliases may be employed without departing from the scope of this disclosure. For example, the sender may select a unique identifier for associating with receiver's payment from the sender who is operating the portable computing device 101 for issuing a payment. In some exemplary embodiments, the sender may select a contact from a contacts list that has an association with the requisite alias that may comprise either an e-mail address and/or a mobile phone number of the receiver.

Next, in block 404, the sender's financial institution 104A receives the alias from the portable computing device 101. The communications between the sender's financial institution 104A and the sender's portable computing device 101 may occur over a secure communications channel as understood by one of ordinary skill the art and as described above in connection with FIG. 1B. The secure communications channel between all of the devices of the system described below may be established using tokens as described above. The communications channels may be established across computer networks 173, such as the Internet, as understood by one of ordinary skill in the art.

Also in block 404, the sender's financial institution 104A will generate an inquiry with its own API that will communicate the alias with the identify payee API 106B2 of the payment switch module 102. The identify payee API 106B2 is described in detail above. In block 406, the payment switch module 102 will execute a query with the consumer alias registry database 108A to determine if the alias transmitted from the sender's financial institution 104A exists in the database 108A.

In decision block 408, the consumer alias registry database 108A will determine if the receiver alias exists or not within its files. If the inquiry to decision block 408 is negative, then the "NO" branch is followed to block 902 of FIG. 9A, which will be described in further detail below. If the inquiry to decision block 408 is positive, then the "YES" branch is followed to block 410.

In block 410, the consumer alias registry database 108A retrieves the record of the destination account associated with the receiver and associated with the receiver's alias. The receiver's alias may also be associated with one or more velocity payment options. Velocity payment options may comprise an immediate transfer of funds into the destination account. This immediate transfer of funds into the destination account may occur when the sender's financial institution 104A in the receiver's financial institution 104B are members of the payment system 100.

The immediate transfer of funds option is one unique feature of the inventive payment system 100. As members of the payment system 100, each member financial institution 104 agrees to honor person-to-person payments such that when a receiver's financial institution 104B of receives a message from the payment switch module 102 that a payment is being made from another member sender's financial institution 104A, then the receiver's financial institution 104B may make funds immediately available upon receiving that message from the payment switch module 102 knowing the trusted obligation from the first financial institution to settle.

Usually, the funds will be made immediately available when the receiver of the second financial institution 104B acknowledges receipt of the person-to-person payment. The second financial institution 104B will then be reimbursed for these immediate funds at the end of the business day by the first financial institution 104A associated with the sender.

Another velocity payment option may comprise an ACH credit to be submitted for the destination account. Another velocity option may include charging up a gift card and/or adding funds to a prepaid or debit account. Velocity options may include any form of payment that may be selected by the receiver. The consumer alias registry database 108A relays this information to the payment switch module 102.

Also in block 410, the payment switch module 102 relays the velocity payment options and destination account to the sender's financial institution 104A which then relays them to the portable computing device 101 of the sender, such as illustrated in FIG. 15C described in detail below. The payment switch module 102 relays this information to the sender's financial institution 104A through the identify payee API 106B2.

In block 412, the sender receives the velocity payment options from the sender's financial institution 104A and then the portable computing device 101 receives one of the velocity payment options selected by the sender. In the exemplary embodiment illustrated in FIG. 4, the sender operating his portable computing device 101 selects the immediate payment velocity payment option. This selection is then relayed to the sender's financial institution 104A.

Next, in decision block 414, the sender's financial institution 104A determines if the payment should be allowed to proceed. Decision block 414 may be tied or connected to an internal fraud checking mechanism such as a rules driven antifraud measure. At a minimum, decision block 414 causes the sender's financial institution 104A to verify that the sender has sufficient funds in his account to make the payment.

If the inquiry to decision block 414 is negative, then the "NO" branch is followed to block 415 in which the payment is rejected for the lack of funds in the sender's account and/or due to a violation of one or more antifraud rules that may be controlled and established by the financial institution 104A. A rejection message may be transmitted to the sender and the method 400 may end.

If the inquiry to decision block 414 is positive, then the "YES" branch is followed to block 416 in which the payment switch module 102 receives the payment request message and then creates a payment through the create payment API 106B3 as described above. In block 416, the payment switch module 102 creates a payment entry in the transaction database 108B. The payment entry in the transaction database reflects that the payment is in a pending status.

Next, in block 418, the payment switch module 102 verifies the payment against network and financial institution risk thresholds that are created through the limits service module 116 as described above in connection with FIG. 1B. As discussed above, the limits service module 116 and its corresponding thresholds were established by the financial institution 104A of the sender which may use the risk limit configuration module 114 that is part of the administrative console module 112. The limits service module 116 may also comprise network thresholds that are established by the payment switch module 102 and more particularly, by the operator of the payment switch module 102.

The network thresholds established by the payment switch module 102 may limit the amount of money that any particular sender may wish to send across the payment switch module 102. The network thresholds in such an instance would track the aggregate amount being transferred by a particular sender over a specific period of time such as within one business day.

The network thresholds may also restrict the amount of money that anyone particular receiver they receive over a specific time. Such as within one business day. One of ordinary skill the art will recognize that other network thresholds are possible and may include any combinations as described above.

Next, in decision block 420, the limits service module 116 determines if any risk limits imposed by the sender financial institution 104A, receiver financial institution 104B, and/or the payment switch module 102 have been exceeded. If the inquiry to decision block 420 is positive, then the "YES" branch is followed to block 502 of FIG. 5 described in further detail below.

If the inquiry to decision block 420 is negative, then the "NO" branch is followed to block 422. In block 422, the payment switch module 102 retrieves a secure party identifier ("SPI") from the secure party identifier generation module 122. As described previously, a secure party identifier generation module 122 produces a unique identifier based on the alias that was matched from the consumer alias registry database 108A. The secure party identifier generation module 122 is coupled to the consumer alias registry 108A. The secure party identifier generation module 122 pulls its data from the consumer alias registry 108A.

According to one exemplary embodiment, a secure party identifier may comprise the last four characters of the receiver's last name and the first three characters of the receiver's first name that are listed in the consumer alias registry 108A. However, other types of data besides the name of the receiver may be utilized without departing from the scope of this disclosure as understood by one of ordinary skill the art. For example, characters for the secure party identifier may be retrieved from e-mail addresses, mobile telephone numbers, mailing addresses, etc.

One exemplary intent of the secure party identifier may include allowing the sender to confirm the identity of the intended receiver so that the sender may correct a selection of a wrong receiver. The secure party identifier should contain enough information so that the sender may easily recognize the intended receiver.

Figures 15D, 15E:
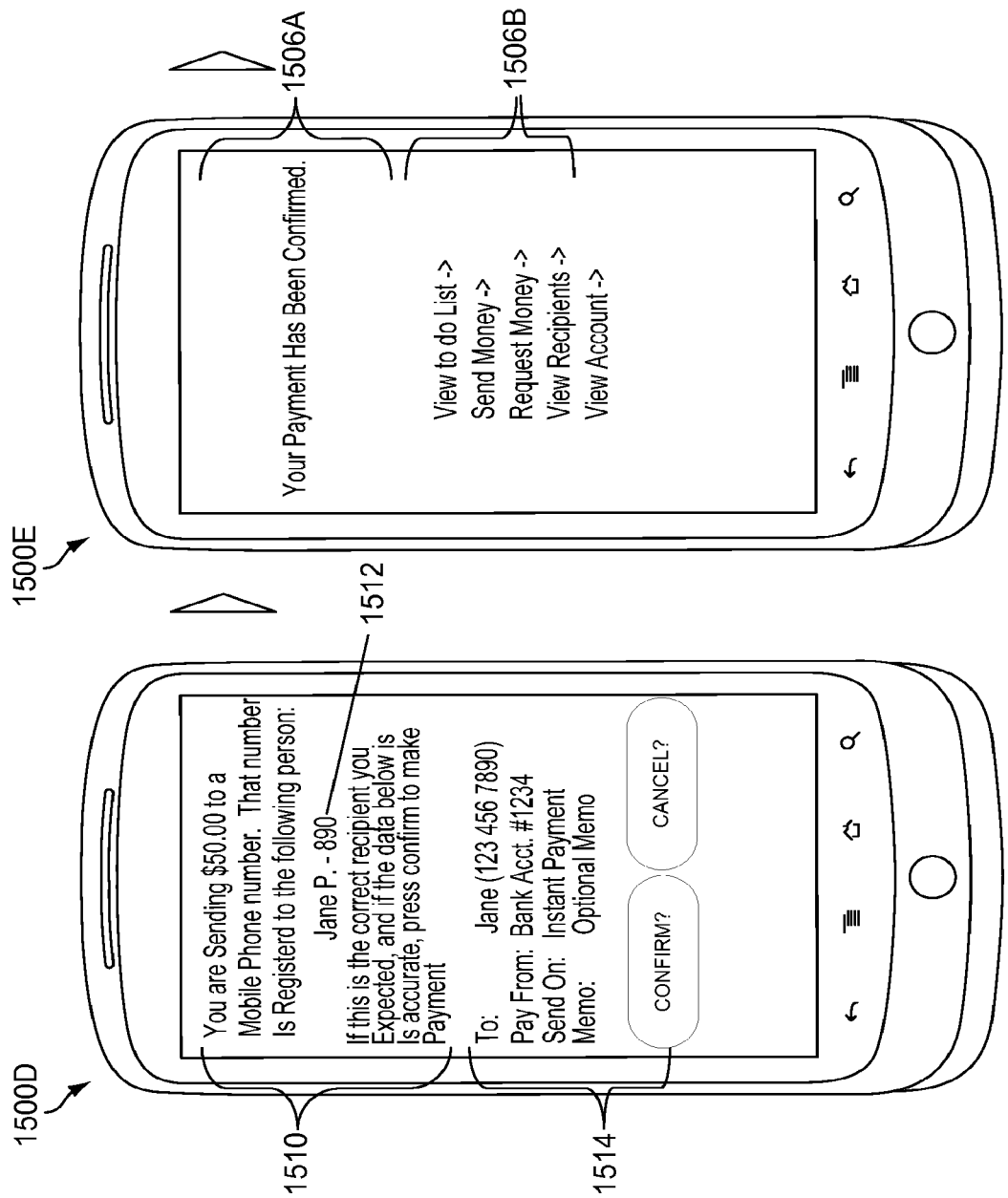
FIG. 15D is an exemplary screen display for a portable computing device that lists a secure party identifier that may be verified by a sender before confirming a payment to a receiver.
FIG. 15E is an exemplary screen display for a portable computing device that lists a message that payment to a receiver has been confirmed.

In block 422, the payment switch module 102 via the create payment API 106B3 forwards the secure party identifier in addition to the payment information such as the payment amount to the sender financial institution 104A. In block 424, the sender financial institution 104A relays the data that includes the secure party identifier and the payment information for display on the portable computing device 101, such as illustrated in FIG. 15D described below. In decision block 426, the portable computing device 101 prompts the sender to select whether or not he or she recognizes the intended receiver based on the secure party identifier.

If the inquiry to decision block 426 is negative, then the "NO" branch is followed to block 602 of FIG. 6. Further details of FIG. 6 will be described below. If the inquiry to block 426 is positive, then the "YES" branch is followed to block 428 in which the sender financial institution 104A will send a message to the payment switch module 102 of the payment confirmation by the sender. This payment confirmation message will be relayed through the set payment status API 106B4 (described above in connection with FIG. 1B) from the sender's financial institution 104A to the payment recipient module 102.

Next, in block 430, the payment switch module 102 updates the entry in the transaction database 108B to reflect that the pending payment has been confirmed by the sender. This confirmation status by the sender triggers additional processing by the payment switch module 102. The additional processing includes blocks 432 and 434.

In block 432, the payment switch module 102 via the process payment status API 106D1 described above transmits a message to the sender financial institution 104A that the payment is now in process. The sender financial institution 104A in this block 432 may also transmit a message to the portable computing device 101A of the sender that indicates the payment has been confirmed, such as illustrated in FIG. 15E described below. In block 434, the payment switch module 102 via the process payment status API 106D1 transmits a message to the receiver financial institution 104B that there is a pending payment for the receiver.

In block 436, the sender's financial institution 104A pulls from the sender's account corresponding to the payment amount and holds the funds for settlement at the predetermined interval established by the operator of the payment switch module 102. Usually this predetermined interval comprises a time at the end of a typical business day. Specifically, the sender's financial institution 104A will withdraw the funds from the sender's account that corresponds to the payment amount and hold these funds in a general ledger account until the predetermined interval which is usually the end of a typical business day.

Next, in block 438, the sender financial institution 104A relays a message to the portable computing device 101 of the sender to indicate that the payment is in process whereby the sender's account with the financial institution 104A has been debited and the payment will be made to the intended receiver shortly.

From block 434 in which the payment switch module 102 has created a pending payment message that is sent through the processing pending payment API 106D2, the receiver financial institution 104B receives that message in decision block 440 and then determines if the receiver has been configured for automatic payment. Automatic payment is an optional feature that may be selected by a receiver such that payments from specific or particular senders may be automatically accepted without confirmation by the receiver.

The system 100 is designed such that a receiver must confirm acceptance of a payment before the payment is completely processed. In this way, a receiver may refuse acceptance of payments from senders that he or she does not know. However, the automatic payment feature allows a receiver to identify specific senders that the receiver will always accept payments from. The automatic payment feature allows a receiver to receive payments from familiar or previous sender's and permits the receiver to receive payments without logging into the system 100.

If the inquiry to decision block 440 is positive, then the "YES" branch is followed to block 442 in which the receiver's financial institution 104B credits funds into the receiver's account from a general ledger account maintained by the receiver's financial institution 104B. Next, in block 444, the receiver's financial institution 104B creates a message that is transmitted to the payment switch module 102 which indicates that the payment to the receiver has been made/completed. This message created in block 444 is transmitted through the set payment status API 106B4 as described above in connection with FIG. 1B.

Then in block 446, the payment switch module 102 receives the message from block 444 via the payment status API 106B4. The payment switch module 102 then updates the transaction database 108B to indicate that the sender's financial institution 104B has completed the payment to the receiver.

In block 448, the payment switch module 102 also creates an entry in a net settlement report to indicate that the payment to the receiver has been made by the receiver's financial institution. This net settlement report may be created for each financial institution 104. An entry may be created in a net settlement report for the receiver's financial institution 104B as well as a net settlement report for the sender's financial institution 104A. The net settlement report may be maintained in the transaction database 108B by the payment switch module 102.

In block 450, the payment switch module 102 creates a message for the sender's financial institution 104A that the receiver's financial institution 104B has completed the payment to the receiver. This message is transmitted from the payment switch module 102 via the process payment status API 106D1 as described above in connection with FIG. 1B.

In block 452, the sender financial institution 104A receives the payment complete status message from the payment switch module 102 via the process payment API 106D1. In block 452, the sender financial institution 104A may create message indicating that the payment has been accepted by the receiver. This message may be transmitted from the sender financial institution 104A to the PCD 101 of the sender. The method 400A at this stage may end or terminate.

Returning back to decision block 440, if the inquiry to this decision block 440 is negative, then the "NO" branch is followed to block 454. In block 454, the receiver's financial institution 104B generates a message that is transmitted to the portable computing device 101B of the receiver. This message indicates that a payment is pending for the receiver and that the receiver needs to log into the system 100 and formally accept the payment from the sender.

This message from the receiver's financial institution 104B may be transmitted in an e-mail or a text message. The transmission format is usually dependent upon a preference selected by the receiver when he or she created their account with their financial institution 104. The message will generally comprise an instruction for the receiver to log in to the system 101 in order to accept the payment from the sender. If the message is sent in either an e-mail or a text message, the message may comprise a hypertext link that allows the receiver to select so that access to the system 101 may be made with little or no effort by the receiver.

In block 456, the portable computing device 101B of the receiver receives the message from the receiver's financial institution 104B. The receiver operating the portable computing device 101B may login to the system 101 at his or her own discretion. The receiver may login to the system 101 within a few minutes or within a few days in order to accept the payment from the sender.

At the end of block 456, the receiver logs into the system 101 and this generates a message that is sent from the portable computing device 101B of the receiver to the receiver's financial institution 104B. In block 458, upon receiving the log-in message from the portable computing device 101B, the receiver's financial institution 104B creates a message that instructs the payment switch module 102 to look up and retrieve any pending payments for the alias associated with the receiver who logged into the system 101. This message in block 456 is transmitted through the process pending payments API 106D2 described above in connection with FIG. 1B.

Next, in block 460, upon receipt of the message sent through the process pending payments API 106D2, the payment switch module 102 looks up and retrieves pending payments for the receiver that are listed in the transaction database 108B. The receiver may have more than one pending payment depending upon the number of payments that may have been sent by other sender's over the course of a period of time.

In this block 460, the payment switch module 102 queries the transaction database 108B for the number of payments pending for the receiver and then creates a message which is transmitted via the process pending payments API 106D2 to the receiver's financial institution 104B. The receiver's financial institution 104B then relays the pending payments to the portable computing device 101B of the receiver.

Next, in decision block 462, the portable computing device 101B prompts the user with an instruction to either accept or reject the pending payments that were retrieved by the receiver's financial institution 104B for the receiver. If the inquiry to decision block 462 is negative, then the "NO" branch is followed to block 702 of FIG. 7. Further details of FIG. 7 will be described below.

If the inquiry to decision block 462 is positive, then the "YES" branch is followed to block 464. The positive inquiry to decision block 462 causes the portable computing device 101B of the receiver to create a message in transmit the acceptance to the receiver's financial institution 104B.

Upon receipt of this acceptance message from the portable computing device 101B, the receiver's financial institution 104B may generate a message back to the portable computing device 101B that includes an option for the receiver to set up the automatic payment configuration so that the receiver does not have to log into the system 101 for this particular sender.

The automatic payment configuration option at this stage may also allow the receiver to configure automatic payment for any sender that forwards payment to the receiver. One additional option that may be displayed and selected by the receiver is to identify which account at the receiver's financial institution 104B should receive the automatic acceptance of payments. Various other auto-pay options may be displayed and available for the receiver to select at this stage as understood by one of ordinary skill the art.

In decision block 466, the portable computing device 101B of the receiver may prompt the receiver to decide whether he or she wants to set up the automatic payment configuration described above. If the inquiry to decision block 466 is positive, then the "YES" branch is followed back to block 468. In this decision block 466, under a positive inquiry, the receiver may enter and select his or her options for the automatic payment configuration. These options for the automatic payment configuration are routed to the receiver's financial institution 104B which are then relayed by the receiver's financial institution 104B through the set auto pay configuration API 106A4 as described above in connection with FIG. 1B.

In block 468, the payment switch module 102 receives the automatic payment configuration options selected by the receiver and stores them in the consumer alias registry database 108A. In block 468, the payment switch module 102 generates a message to indicate that the automatic payment options have been received and stored in the consumer alias registry database 108A. This confirmation message is relayed back to the sender's financial institution 104B via the set auto pay configuration API 106A4. After block 468, the process returns to block 442 in which the receiver's financial institution 104B credits funds into the receiver's account corresponding to the payment amount as described above.

Similarly, if the inquiry to decision block 466 is negative, then the "NO" branch is followed to block 442. As described above, in block 442, the receiver's financial institution 104B credits funds into the receiver's account corresponding to the payment amount from the general ledger maintained by the receiver's financial institution 104B. Block 442 is the same block which was reached from the positive inquiry path at the output of decision block 440 described above.

FIG. 5 illustrates a continuation flowchart of the method 400B of FIGS. 4A-4B for processing a member financial institution customer payor to a member financial institution customer payee. Block 502 is the first step in method 400B which originates from a positive result or the "YES" branch following decision block 420 in which a risk limit has been exceeded as verified by the limit service module 116 of the payment module 102.

In block 502, the limits service module 116 identifies what limits have been exceeded with respect to the payment that was ordered by the sender. As described above, the limits service module 116 and its corresponding thresholds may be established by the financial institution 104A of the sender which may use the risk limit configuration module 114 that is part of the administrative console module 112. Similarly, the limits service module 116 and its corresponding thresholds may be established by the financial institution 104B of the receiver which may use the risk limit configuration module 114 that is part of the administrative console module 112. The limits service module 116 may also comprise network thresholds that are established by the payment switch module 102 and more particularly, by the operator of the payment switch module 102.

The network thresholds established by the payment switch module 102 may limit the amount of money that any particular sender may wish to send or any particular receiver who may receive money across the payment switch module 102. The network thresholds in such an instance would track the aggregate amount being transferred by a particular sender over a specific period of time such as within one business day. The network thresholds may also restrict the amount of money that anyone particular receiver they receive over a specific time, such as within one business day. One of ordinary skill the art will recognize that other network thresholds are possible and may include any combinations as described above.

In block 502, the limit service module 116 generates a message that identifies the one or more risk limits that have been exceeded by the sender's request to transfer money to the intended receiver. This message created in block 502 is transmitted through the create payment API 106B3 and is sent to the sender's financial institution 104A.

In block 504, the payment switch module 102 stores the risk limit conditions that were exceeded in the transaction database 108B. Meanwhile, in block 506, the sender's financial institution receives the risk limit exceptions message via the create payment API 106B3 and then generates its own message that is relayed to the portal computing device 101 of the sender which states that the payment could not be processed. It is at the discretion of the sender's financial institution 104A of what level of information about the risk limit exception is conveyed to the sender.

Usually, to avoid any potential for controversy, the sender's financial institution 104A will merely state that the transaction could not be processed. The message will usually state that the sender needs to contact the sender's financial institution 104A to get any additional detail about the rejection of the transaction.

According to an alternate exemplary embodiment, the payment switch module 102 may support one or more override features that allow sender and receiver financial institutions 104 to allow for overrides with respect to risk limit exceptions. Therefore, if a sender or a receiver's alias is placed on an override list created by one of the financial institutions 104, the payment switch module 102 may allow a transaction to occur even if the transaction exceeds a risk limit since the sender or receiver (or both) are present on an override list which allows such individuals to exceed risk limits imposed by financial institutions 104.

FIG. 6 illustrates a continuation flowchart of the method 400C of FIGS. 4A-4B for processing a member financial institution customer payor to a member financial institution customer payee. Block 602 is the first step in method 400C which originates from a negative result or the "NO" branch following decision block 426 of FIG. 4 in which a sender cancels a payment because he or she does not recognize the secure party identifier ("SPI") presented in block 424 of FIG. 4.

In block 602, the sender's financial institution 104A receives the message that was created by the portable computing device 101 of the sender which indicates that the sender has decided to cancel the payment transaction. The sender's financial institution 104A then relays this message through the set payment status API 106B4 to the payment switch module 102.

In block 604, the payment switch module 102 receives the message from the sender's financial institution 104A via the set payment status API 106B4 and then updates the payment status in the transaction database 108B to indicate that the payment has been canceled by the sender. The transaction database 108B may be designed such that it tracks all transactions, including ones that have been canceled like the exemplary embodiment illustrated in FIG. 6, for some period of time. This period of time is usually set by government regulations. Such regulations usually require transaction records to be kept for a time period of at least five years or more.

FIG. 7 illustrates a continuation flowchart of the method 400D of FIGS. 4A-4B for processing a member financial institution customer payor to a member financial institution customer payee. Block 702 is the first step in method 400D which originates from a negative result or the "NO" branch following decision block 462 of FIG. 4 in which the receiver rejects payment when the receiver logs into his receiver financial institution 104B to check on what payments have been received from one or more other sender's.

As noted previously, it may take one or more days before a receiver logs into his account with his receiver financial institution 104B so that he may be advised of the one or more payments that have been transmitted to him by one or more senders via the payment switch module 102. This negative condition from block 462 of FIG. 4 is also a result of the receiver not completing or electing to receive payments automatically according to the automatic accepting feature/option that may be selected in previous block 440 of FIG. 4.

In block 702, upon receiving the message from the portable computing device 101B operated by the receiver indicating that the receiver has rejected the payment from the sender, the receiver financial institution 104B closes or cancels this payment transaction and generates a message for relaying this information to the payment switch 102. In block 704, the receiver financial institution 104B relays the rejection payment message via the set payment status API 106B4 to the payment switch module 102.

In block 706, upon receipt of the rejection payment message via the set payment status API 106B4 from the receiver's financial institution 104B, the payment switch module 102 updates the transaction database 108B to reflect that the payment transaction has been canceled. The payment switch module 102 then creates a message for relaying this information to the sender's financial institution 104A. In block 708, the payment switch module 102 via the process payment status API 106D1 relays the rejection payment message to the sender's financial institution 104A.

In block 710, upon receiving the rejection payment message through the process payment API 106D1, the sender's financial institution 104A may reverse the prior debit to the sender's account and release funds back into the sender's account that correspond to the amount of the original payment created by the sender. This block 710 is followed to counteract or balance out block 436 of FIG. 4 in which the sender's account was previously debited and the funds were held in the settlement account by the sender's financial institution 104A.

In block 712, the sender's financial institution 104A may create a message for relaying to the portable computing device 101 of the sender that indicates that the payment transaction has not been processed. According to one exemplary embodiment, this message may state that the payment was rejected by the receiver. In other exemplary embodiments, a financial institution 104A may simply state in the message for the sender to contact the financial institution 104A by telephone or other ways to obtain more details about the rejected transaction.

FIG. 8A illustrates a separate flowchart of a method 800A for checking on payments that have expired for lack of acceptance by a receiver. Method 800A runs in parallel with respect to Method 400 of FIG. 4 and is generally executed by the payment switch module 102, and specifically, the expired payments tracking module 124 of the payment switch module 102.

Method 800A corresponds to a time element with respect to decision block 462 of FIG. 4 in which the receiver has failed to log into his receiver financial institution 104B within a predetermined amount of time. This predetermined amount of time may be established by the payment switch 102. Exemplary time limits include, but are not limited to, fourteen calendar days or 10 business days, or the like.

Block 802 is the first step of method 800A. In block 802, the payment switch module 102 (via its expired payments tracking module 124) conducts searches within the transaction database 108B for expired payments—those payments which have exceeded the time limit established by the payment switch module 102, and more particularly, the operator of the payment switch module 102 who uses the administrative console module 112.

In block 804, the expired payments transaction module 124 updates those active payments in the transaction database 108B that have expired. As described above, payment expiration may occur due to the receiver not logging into his or her account at a respective receiver financial institution 104B within the predetermined period of time established by the payment switch module 102.

Next, in block 806, the expired payments transaction module 124 creates an expired payment message for delivery to the sender's financial institution 104A. The expired payments transaction module 124 relays this expired payment message to the sender's finance will institution 104A through the process payment status API 106D1 that is described above.

In block 808, the sender's financial institution 104A upon receiving the expired payment message via the payment status API 106D1, reverses the debit that was made to the sender's account and releases the funds back into the sender's account similar to block 710 of FIG. 7 described above. Like block 710 of FIG. 7 described above, block 808 to counteracts/cancels-out the debit block 436 of FIG. 4 which was made to correspond with the payment amount in the payment request established by the sender.

Next, in block 810, which is similar to block 712 of FIG. 7, the sender's financial institution 104A may create a message for relaying to the portable computing device 101 of the sender that indicates that the payment transaction has not been processed. According to one exemplary embodiment, this message may state that the payment has expired. In other exemplary embodiments, a financial institution 104A may simply state in the message for the sender to contact the financial institution 104A by telephone or other ways to obtain more details about the rejected transaction. Method 800A then ends.

FIG. 8B illustrates a separate flowchart of a method 800B for retrieving payments that have expired for lack of acceptance by a receiver. Method 800B may be executed by the expired payments tracking module 124 of the payment switch module 102. Block 812 is the first step of method 800B.

In block 812, a receiver may use his portable computing device 101B to log into his receiver financial institution 104B after the expiration of one or more payment transactions. In this block 812, the receiver may send a message from his portable computing device 101B to his receiver financial institution 104B to retrieve any current and pending payment transactions intended for the receiver.

In block 814, the receiver's financial institution 104B may receive the payment inquiry message from the portable computing device 101B and then generate its own message containing this inquiry by using the process pending payment API 106D2 that is described above in connection with FIG. 1B and then relay this message to the payment switch module 102.

Next, in block 816, the payment switch module 102 upon receiving the payment inquiry message via the process pending payments API 106D2 may execute a query with the transaction database 108B to identify those payments which are pending for the receiver. In some exemplary embodiments, expired payments due to timeouts (wherein the receiver has failed to log into the receiver financial institution 104B within a certain period of time) may not be displayed. According to these exemplary embodiments, the payment switch module 102 via the process pending payments 106D2 will relay this message to the receiver's financial institution 104B.

In other exemplary embodiments, at the discretion of a receiver's financial institution 104B, the payment switch module 102 may relay a listing of expired payments that cannot be completed to the receiver's financial institution 104B so that the receiver's financial institution 104B may relay this information back to the receiver.

In block 818, upon receiving the message from the payment switch module via the process pending payments 106D2 may generate a message for relaying this information to the portable computing device 101B of the receiver. As noted above, this message may include that there are no payments pending since all payments have been expired or a message that includes a listing of expired payments that cannot be completed due to the receiver failing to log into the financial institution 104B within the predetermined periods of time established for a respective payment.

Each receiver financial institution 104B at its discretion may also include a message that tells the receiver the predetermined time period in which he or she needs to log into the financial institution 104 in order to accept a payment or how the receiver may set up the automatic payment/receive option for particular senders. For each expired payment, the receiver will need to request each sender to order or create a new payment transaction. Method 800B then ends.

FIG. 9A illustrates a continuation flowchart of a method 400E of FIGS. 4A-4B for processing a member financial institution customer payor to a member financial institution customer payee. Block 902 is the first step in method 400E which originates from a negative result or the "NO" branch following decision block 408 of FIG. 4 in which the receiver is not present in the consumer alias registry database 108A. Decision block 408 is checking to determine if a receiver identified by the sender exist within the alias registry database 108A.

In block 902, the payment switch module 102 returns non-velocity type payment options that are available to the sender for a receiver which is not present within the consumer alias registry 108A. When a receiver is not present within the consumer alias registry 108A, this means that the receiver does not have a financial institution 104 that may receive payments from the payment switch module 102. In other words, the receiver's financial institution 104B may not be a member or a subscriber of the system 100 that includes the payment switch module 102.

Non-velocity type payment options are those which do not include the person-to-person payment functions supported by the payment switch module 102. The non-velocity type payment options may include, but are not limited to, ACH transfers, wire transfers, and the sender financial institution 104A issuing a check on the behalf of the sender to the receiver.

In block 902, the payment switch module 102 creates the list of non-velocity type payment options and places this list in a message which is transmitted to the sender's financial institution 104A utilizing the identify payee API 106B2 that is described above. Upon receiving the message containing the non-velocity type payment options, the sender's financial institution 104A may relay this message to the portable computing device 101 operated by the sender.

In block 904, the sender may select from the list of non-velocity type payment options that were transmitted by the sender's financial institution 104A. The portable computing device then relays a message containing the selection of the non-velocity type payment option to the sender's financial institution 104A.

Next, in decision block 906, the sender's financial institution 104A receives the selected payment option and then determines if the payment option should be allowed to proceed. Decision block 906, is like decision block 414 of FIG. 4, and it may be tied or connected to an internal fraud checking mechanism such as a rules driven antifraud measure. At a minimum, decision block 906 causes the sender's financial institution 104A to verify that the sender has sufficient funds in his account to make the payment.

If the inquiry to decision block 906 is negative, then the "NO" branch is followed to a termination in which the method 400E ends. If the inquiry to decision block 906 is positive, then the "YES" branch is followed to block 908. If the inquiry to decision block 906 is positive, the sender's financial institution 104A creates a message which is transmitted through the create payment API 106B3 that is described above. This message is relayed to the payment switch module 102.

In block 908, the payment switch module 102 generates a payment upon receiving the message from the sender's financial institution 104A via the create payment API 106B3. Block 908 is similar to block 416 of FIG. 4. In this block, the payment switch module 102 creates a payment entry in the transaction database 108B. The payment entry in the transaction database 108B reflects that the payment is in a pending status but is going to occur via a non-velocity payment option that was selected by the sender.

Next, in routine block 910, the payment switch module 102 issues a non-velocity payment command to the sender's financial institution 104A. For example, if the ACH transfer was selected for the non-velocity payment option by the sender, then the payment switch module 102 may issue an ACH transfer command to the sender's financial institution 104A which can then process the command like routine ACH transfers.

Routine block 910 may comprise various steps and may include such steps like blocks 416-434 of FIG. 4 described above, but in a non-velocity payment context. The main difference upon the selection of a non-velocity payment option under this method 400E is that there is no immediate debit of funds from the sender's account such as noted in block 436 of FIG. 4, like in an ACH transfer scenario.

Figure 9B:
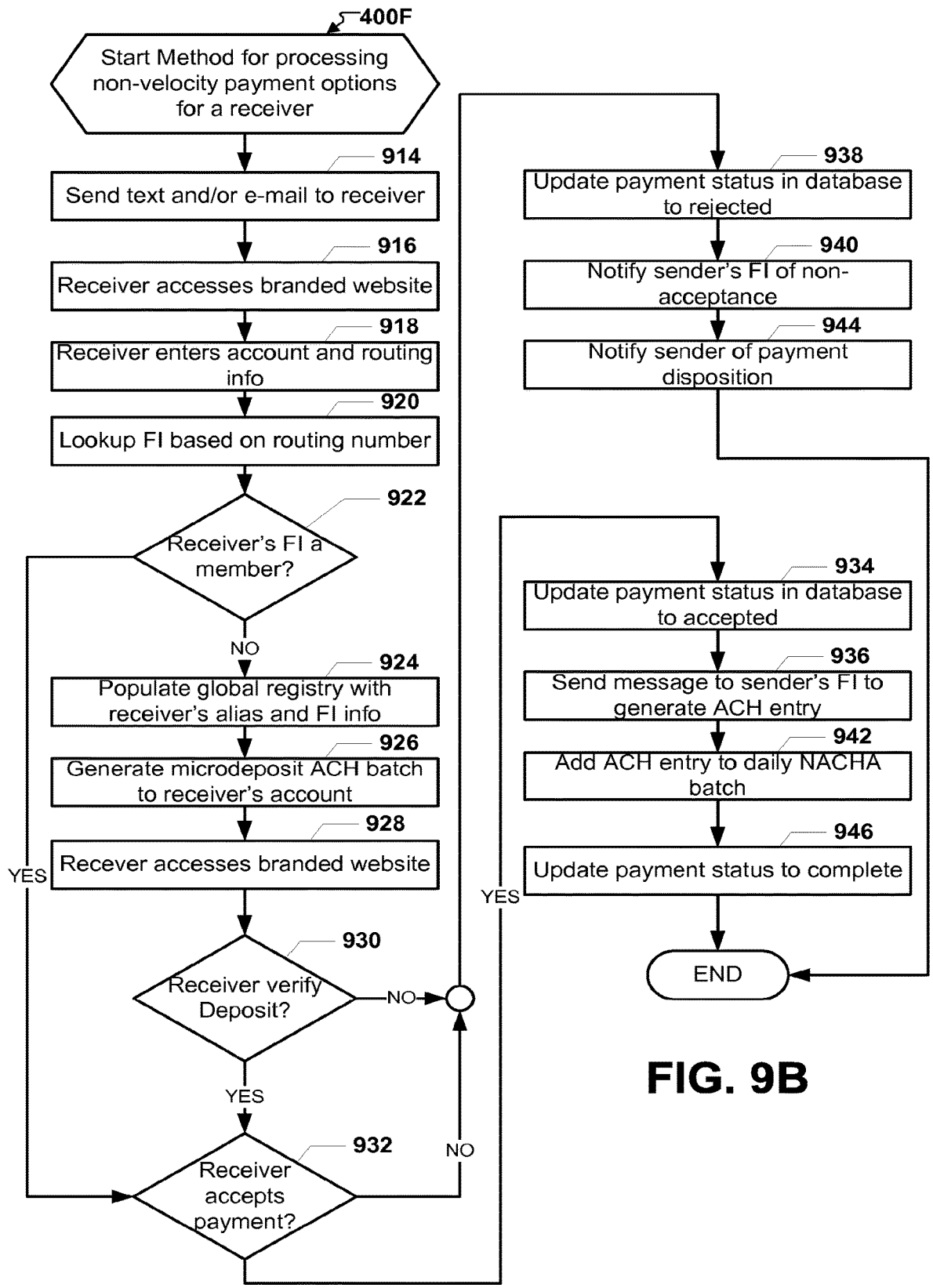
FIG. 9B illustrates a separate flowchart of a method for processing non-velocity payment options, like an ACH transfer, for a receiver does not have an account with a financial institution that is part of the system.

FIG. 9B illustrates a separate flowchart of a method 400F for processing non-velocity payment options, like an ACH transfer, for a receiver does not have an account with a financial institution 104B that is part of the system 100.

Method 400F runs in parallel with respect to Method 400E of FIG. 9A and is generally executed by the payment switch module 102 and a receiver's financial institution 104B.

Block 914 is the first step of method 400F. In block 914, the payment switch module 102 sends a communication to the receiver using the alias provided by the sender which may include, but is not limited to, an e-mail address or a mobile phone number. This communication may include a hypertext link to the registration website 110 as described above in connection with FIG. 1B.

In block 916, using his portable computing device 101B, the receiver may access the branded registration website 110 that corresponds to the financial institution 104B at which the receiver may have an account. In block 918, the receiver may enter into his portable computing device 101B the account number associated with his financial institution 104B as well as any routing information associated with account. If the non-velocity option of an ACH transfer was selected by the sender, then the receiver would be prompted in block 918 for the receiver to enter his or her checking account number and routing number associated with the checking account.

Once the information in block 918 was entered, then the registration website 110 would relay this information to the payment switch module 102. In decision block 920, the payment switch module 102 would look up the receiver's financial institution 104B based on the routing number associated with the account to determine if the receiver financial institution 104B is part of and/or subscribes to the system 100.

Next, in decision block 922, the payment switch module 102 determines if the receiver's account is associated with a financial institution 104B that is part of and/or subscribes to the system 100. If the inquiry to decision block 922 is positive, then the "YES" branch is followed to block 932 described below.

If the inquiry to decision block 922 is negative, then the "NO" branch is followed to block 924. In block 924, the payment switch module 902 populates the consumer alias registry 108A with the receiver's alias (e-mail address and/or mobile phone number) along with the financial institution information. Next, in block 926, the payment switch module 102 generates a micro deposit ACH batch for sending to the receiver's account of his receiver's financial institution 104B.

After a few days to allow for the micro deposit to hit the receiver's account in his receiver's financial institution 104B, in block 928, the receiver may again access the branded registration website 110 of his financial institution 104B with his portable computing device 101B. Next, in decision block 930, the receiver may verify the micro deposit made by the payment switch module 102 into his checking account with his receiver financial institution 104B.

If the inquiry to decision block 930 is negative, meaning that the receiver has entered the wrong amount for the micro deposit, then the "NO" branch may be followed to block 938. As part of the negative condition of block 930, the receiver's financial institution 104B would transmit the error condition of the negative consequence for decision block 932 the payment switch module 102.

If the inquiry to decision block 930 is positive, then the "YES" branch is followed to decision block 932. In decision block 932, the portable computing device 101B of the receiver prompts the receiver to accept the payment from the sender. If the inquiry to decision block 932 is negative, then the "NO" branch is followed to block 938.

If the inquiry to decision block 932 is positive, then the "YES" branch is followed to block 934. In block 934, the payment switch module 102 updates the payment status in the transaction database 108B to an accepted status. Next, in block 936, the payment switch module 102 via the process ACH payment (non-instant payment) API 106D3 described above issues a message to the sender's financial institution 104A to process an ACH payment.

In block 942, the sender's financial institution 104A upon receipt of the message from the payment switch module 102 via the non-instant payment API 106D3 may add the ACH entry to its North American Clearing House ("NACHA") batch file. Also in block 942, the sender's financial institution 104A may generate a message and transmit it using the set payment status API 106B4 to the payment switch module 102. In block 946, upon receipt of the message from the sender's financial institution 104A via the set payment status API 106B4, may update the payment status in the transaction database 108B to complete. And then the method 400F may end.

Following decision block 932 along the negative condition or the "NO" branch, in block 938, the payment switch module 102 may update the payment status in the transaction database 108B to rejected. Next, in block 940, the payment switch module may generate a message for sending to the sender's financial institution 104B. This message may indicate the rejection or non-acceptance of the payment by the receiver via the process payment status API 106D1.

In block 944, the sender's financial institution 104A may notify the sender of the non-acceptance of the payment by the receiver by transmitting a message to the portable computing device 101A of the sender. Next, the method 400F may end.

Figure 10:
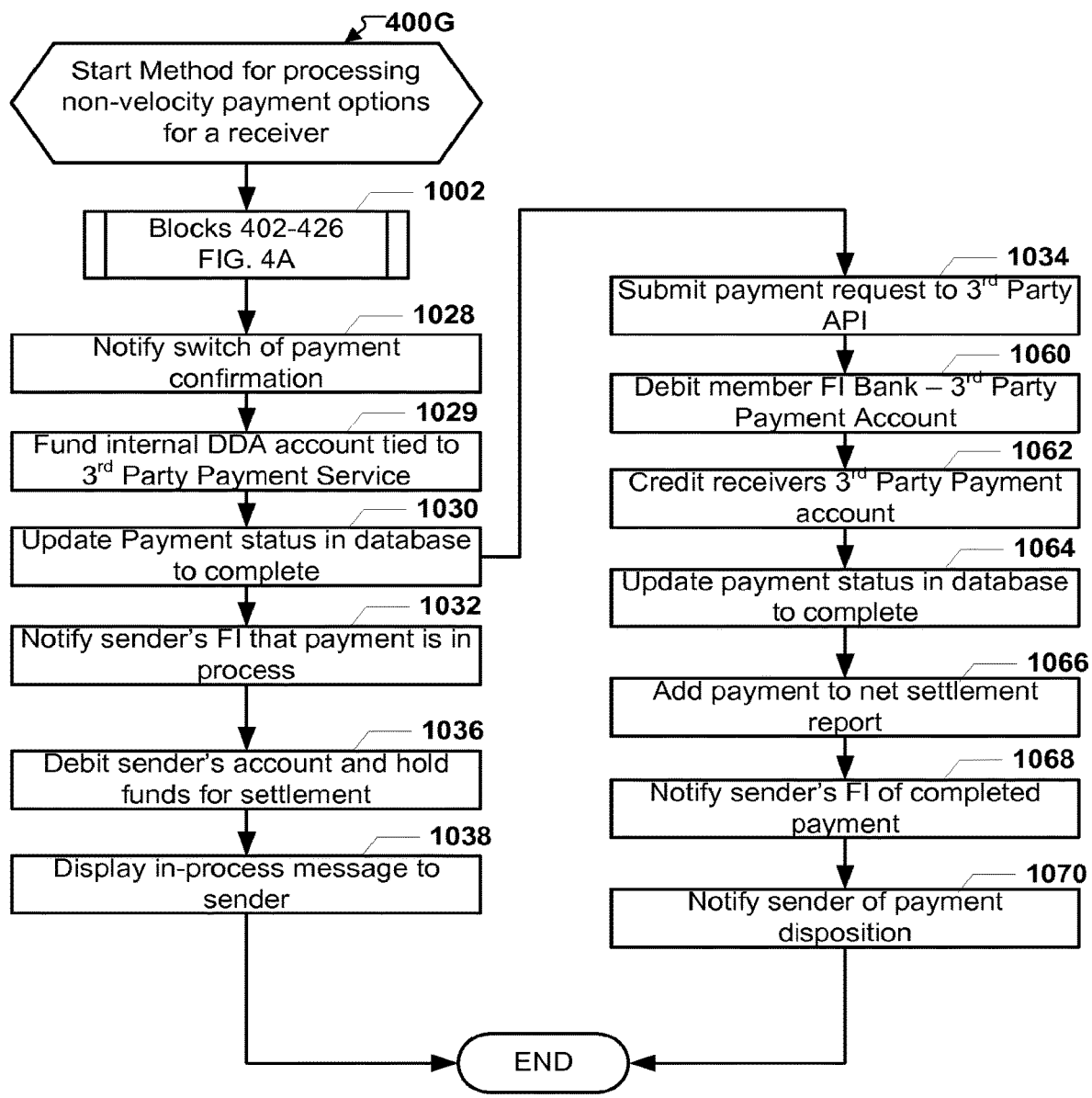
FIG. 10 illustrates a continuation flowchart of a method for processing a member financial institution customer payor to a member third-party payment service customer payee.

FIG. 10 illustrates a continuation flowchart of a method 400G for processing a member financial institution customer payor to a member third-party payment service customer payee. The third-party payment service may comprise a service such as PAY-PAL™ known at the time of this writing.

This method 400G shares many of the steps illustrated in FIG. 4 so they will not be repeated here. Specifically, as indicated by block 1002 which lists blocks 402-426 as its contents, this block means that blocks 402 through 426 are performed up to this point for this method 400G.

The remaining blocks of FIG. 10 may share similar reference characters as corresponding blocks in FIG. 4. Therefore, if a block in FIG. 10 shares in common the same last two digits of a block listed in FIG. 4, then such blocks in FIG. 10 are identical to those in FIG. 4 and further explanation will not be provided. Only the difference between the blocks in FIG. 4 and FIG. 10 will be described below.

After block 1002 (which comprises blocks 402-426 of FIG. 4 described above), block 1028 which is identical to block 428 of FIG. 4 occurs in which a message is created by the sender's financial institution 104A to indicate that payment has been confirmed by the sender. Next, in block 1029 (which is new and unique relative to FIG. 4), an internal demand deposit account relative within sender's financial institution 104A, and which is tied to a dedicated third-party service (i.e. PAY-PAL™) account, is funded in an amount corresponding to the payment selected by the sender with his portable computing device 101A.

Block 1029 is unique since it addresses the structure of many third-party service payment providers that only permit transfers of funds between accounts which are identical and are only maintained by the third-party service in a provider, such as in PAY-PAL™ accounts as of this writing.

Each sender's financial institution 104A will usually establish a third-party service account (i.e. with PAY-PAL™) that is tied to a demand deposit account ("DDA") or general ledger account that it maintains. In this way, sender's financial institution 104A can instruct transfers to be made from its third-party service account and this third parties service account will siphon funds are pooled funds from its demand deposit account or general ledger account.

As understood by one of ordinary skill in the art, as of this writing, third-party service accounts do not require funds in order to be maintained by the third-party service provider. However, these third-party service accounts usually require a link or direct connection to a funding or "source" account at a financial institution or a credit card account.

Blocks 1030-1038 generally correspond to their counterpart blocks 430-438 of FIG. 4 and will not be discussed further here. However, in block 1034, instead of notifying the receiver's financial institution 104B of a pending payment, in this block a payment switch module 102 submits a payment request to the third-party API 106E1 as described above in connection with FIG. 1B.

Blocks 1060-1070 are different and new relative to FIG. 4 and will be described as follows. In block 1060, the third-party service provider 118 receives the payment request message via the third-party API 106E1 and debits the sender's financial institution third-party service account in an amount corresponding to the payment requested by the sender.

Next, in block 1062, the third-party service provider 118 credits the receiver's third-party service account in an amount that corresponds to the debit to the financial institutions third-party service account (which will be the amount of the payment request specified by the sender). Also in this block 1062, the third-party payment service provider 118 creates a message that indicates the transfer between the financial institutions third-party payment account and the receiver's third-party payment account has occurred.

In block 1064, the payment switch module 102 receives the payment complete message from the third-party payment service provider 118 and then updates the payment status in the transactional database 108B to complete. Next, in block 1066, the payment that was made into the demand deposit account tied to the third-party payment service account is added to the net settlement report also maintained in the transactional database 108B.

In block 1068, the payment switch module 102 generates a message to indicate that the payment has been completed and it transmits this message to the sender's financial institution 104A. In block 1070, the sender's financial institution 104 receives the payment complete message from the payment switch module 102 and then generates its own payment complete message is relayed to the portable computing device 101A of the sender. Method 400G then ends.

Figure 11A:
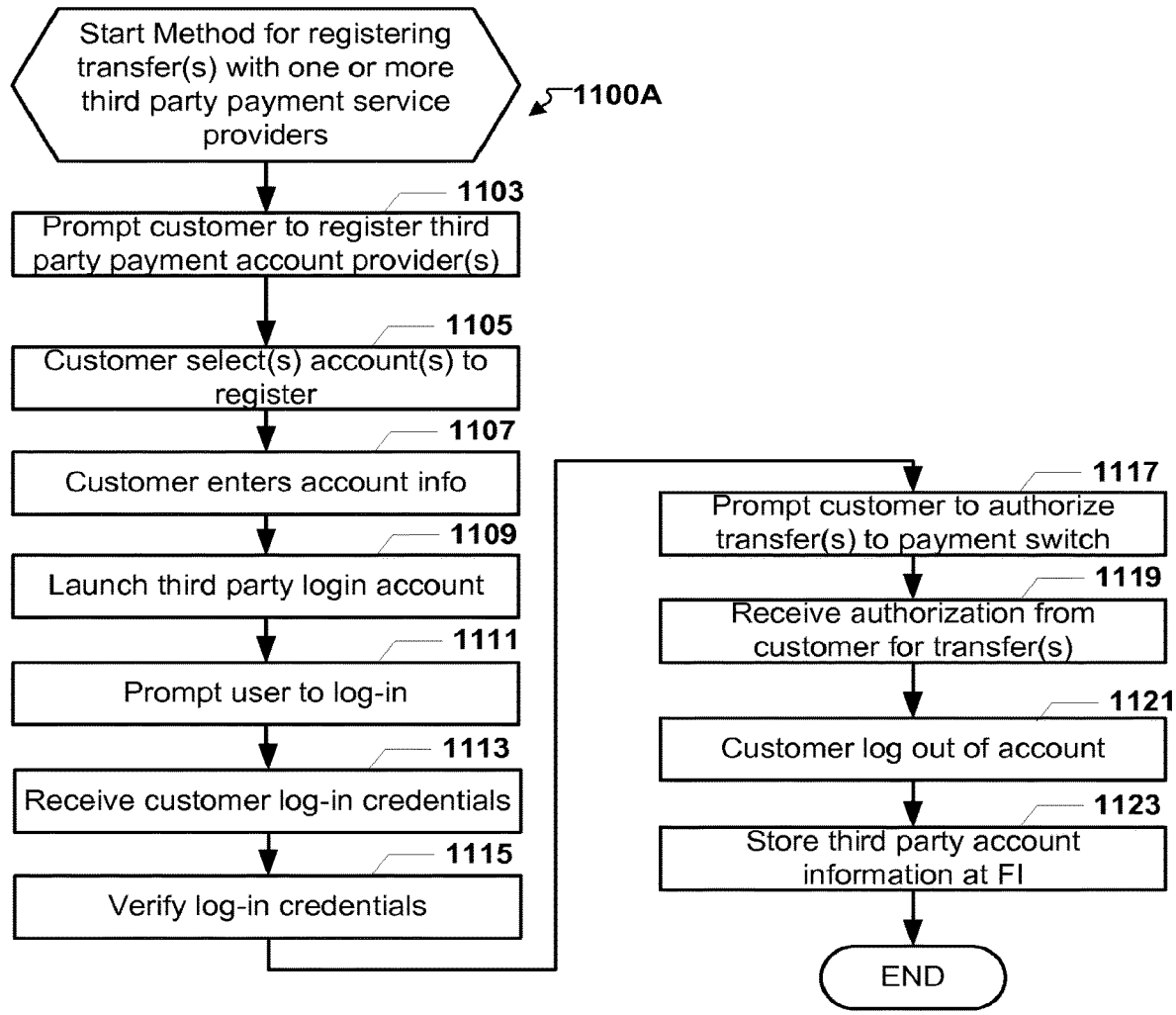
FIG. 11A illustrates a separate flowchart of a method for registering a third party payment service account (i.e. like PAYPAL™ or AMAZON™ payments) for transferring funds to a financial institution.

FIG. 11A illustrates a separate flowchart of a method 1100A for registering a third party payment service provider account (PAYPAL™, AMAZON™, etc.) 118 for transferring funds to a financial institution (i.e. a bank) 104. With this method 1100A, the financial institution 104 may redirect the customer to a website of the third party payment provider 118 so the customer can log in.

Setting up a preauthorization for transfers with a third party payment service provider 118 usually has to be done manually, but a customer usually must make such authorizations from within the website of the third party service provider 118. This capability may be available via an API between the third party payment service provider 118 and a financial institution 104 as understood by one of ordinary skill in the art.

Once the customer has configured the preauthorization for transfers through the payment switch module 102, a member financial institution 104 may store the parameters for the account of the third party payment service provider 118 as they would any other external financial institution 104 that may also be used for transfers.

Block 1103 is the first block of method 1100B. In block 1103, the financial institution 104 prompts the portable computing device 101 of the customer such that the customer registers his or her account with the third-party payment service provider 118. Next, in block 1105, the customer through the portable computing device 101 picks or selects the account of his third-party payment service provider 118 in which he wishes to register with the financial institution 104 for periodic transfers from the third-party payment service provider 118 to the financial institution 104.

Next, in block 1107, the portable computing device 101 receives the account information for the third-party payment service provider 118. This may include the account number, date the account was opened, and/or other similar identifying information. In the same block 1107, this account information for the third-party payment service provider 118 is transferred back to the financial institution 104.

Once the financial institution 104 receives this account information for the third-party payment service provider 118, the financial institution 104 in block 1109 may launch a login webpage for the third-party payment service provider 118. Next, in block 1111 the third-party payment service provider 118 may display the login website page for the customer to enter his or her account credentials with the third-party financial service provider 118.

In block 1113, with a portable computing device 101, the customer may enter his or her login credentials for their account with the third-party payment service provider 118. In the same block 1113, the financial institution 104 relays these credentials to the third-party payment service provider 118.

In block 1115, the third-party payment service provider 118 verifies the login credentials from a customer. If the credentials are valid, then in block 1117, the third-party payment service provider 118 may provide options for the customer to select in order to authorize transfers to the payment switch module 102. These options are relayed to the portable computing device 101 via the financial institution 104.

Next, in block 1119 the portable computing device 101 may receive authorization from the customer for permitting transfers from the third-party payment service provider 118 to the financial institution 101. At block 1121, the customer may use his or her portable computing device to logout of the third-party payment service provider's website. In block 1123, the financial institution 104 may store the customer's account information that corresponds to the third-party payment provider account. The process or method 1100A may then end.

Figure 11B:
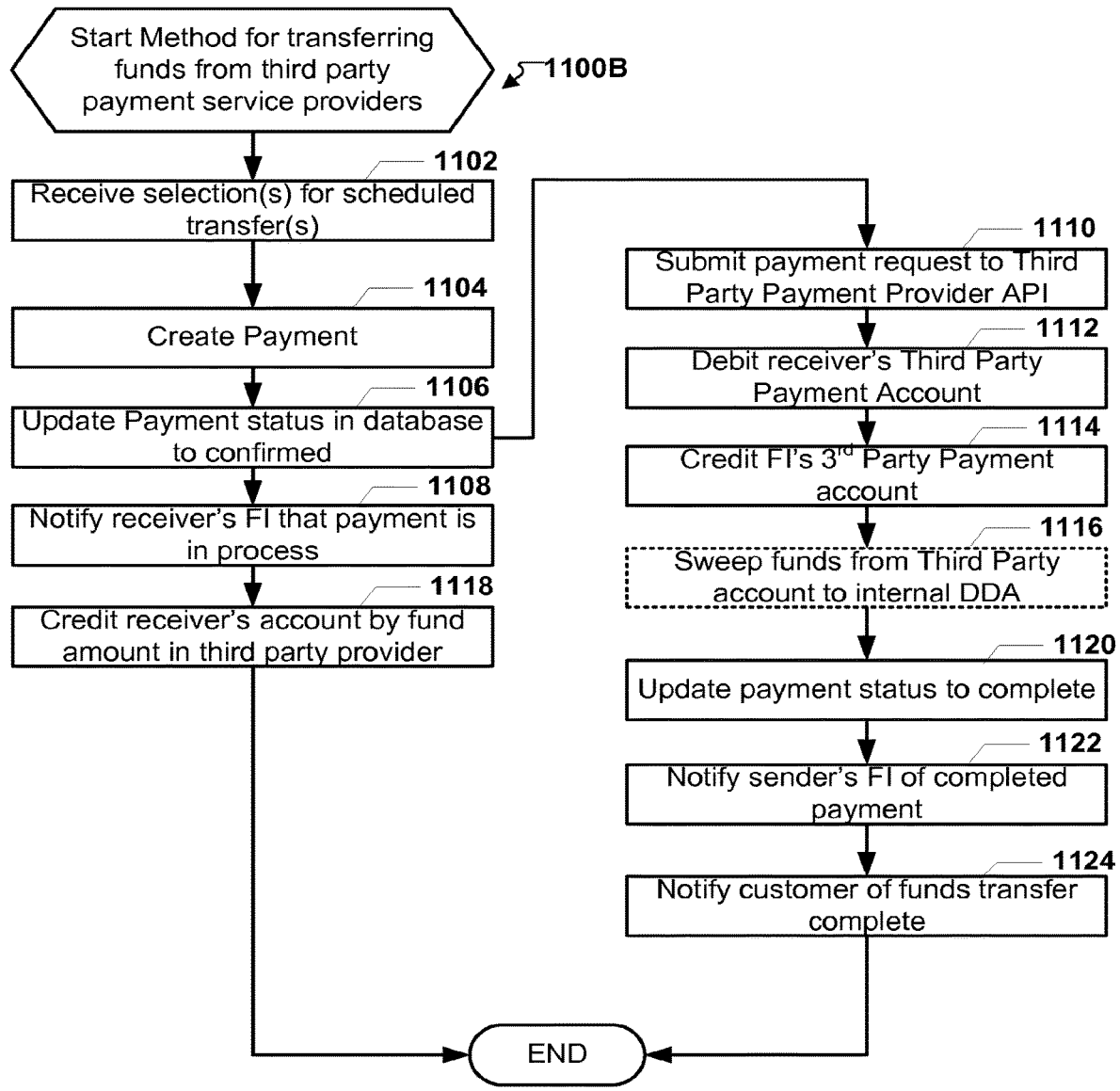
FIG. 11B illustrates a separate flowchart of a method for automatically transferring funds from a third party payment service account (i.e. like PAYPAL™ or AMAZON™ payments) on a recurring basis to a receiver's financial institution.

FIG. 11B illustrates a separate flowchart of a method 1100B for automatically transferring funds from a third party payment service account (i.e. like PAYPAL™ or AMAZON™ payments) on a recurring basis to a receiver's financial institution 104B. This method 1100B may be particularly useful for those receiver's who receive payments through third-party payment service accounts frequently.

Block 1102 is the first block of method 1100B. In block 1102, the receiver's financial institution 104B may receive the one or more selections that a receiver may choose in order to schedule one or more transfers from his third-party payment service account (i.e. PAYPAL™ or AMAZON™ payments account) to his account present in the receiver's financial institution 104B, including the capability for setting regularly scheduled recurring payments.

Block 1102 may further comprise the receiver's financial institution 104B initiating method 1100 in response to the times and days selected by the receiver via a user interface supplied by the receiver's financial institution 104B. A message is generated by the receiver's financial institution 104B in this message is relayed to the payment switch module 102 via the create payment API 106B3 that is described above.

In block 1104, upon receiving the message via the create payment API 106B3, the payment switch module 102 creates a payment similar to block 416 in FIG. 4A. In block 1104, the payment switch module 102 creates a payment entry in the transaction database 108B. The payment entry in the transaction database reflects that the payment (technically a transfer) from the third-party payment service account is in a pending status.

Even though the current transaction is a transfer between accounts, the create payment API 106B3 may still be employed since the transaction is similar to a payment to oneself from the perspective of the receiver's financial institution 104B. Next, in block 1106, the payment switch module 102 updates the entry in the transaction database 108B to reflect that the pending payment has been confirmed by the sender. This confirmation status by the sender triggers additional processing by the payment switch module 102. The additional processing includes block 1108.

In block 1108, the payment switch module 102 via the process payment status API 106D1 described above transmits a message to the sender financial institution 104A that the payment is now in process.

In block 1108, the payment switch module 102 via the process payment status API 106 D1 described above transmits a message to the sender financial institution 104A that the payment is now in process.

In block 1110, a payment switch module 102 submits a payment request to the third-party API 106E1 as described above in connection with FIG. 4.

In block 1112, upon receipt of the message from the payment switch 102 via the process payment status API 106B3, the third-party payment service provider 118 may debit the receiver's third party payment service account according to its current balance or some other amount selected by the receiver. In block 1114, the amount of the debit completed in block 1112 is transferred into the receiver's financial institution third-party payment service account that is maintained by the receiver's financial institution 104B.

In block 1116, the receiver's financial institution 104B may sweep funds from its third-party payment service account to their internal demand deposit account ("DDA") in order to offset the credit of funds that is made to the receiver's account made in block 1118. The action performed in block 1116 between the receiver's financial institution 104B and the third party payment service provider 118 may be customized or tailored for each financial institution 104 based on the agreement it has with the third party payment service provider 118.

In block 1118, which originates from block 1108 and which may be performed in parallel with block 1112, the receiver's financial institution 104B may credit the receiver's account by the amount/balance found by the payment switch 102 in the receiver's third-party payment service account. The point in time in which block 118 occurs may be adjusted in tailored by each financial institution. As noted previously, block 1108 comprises a message from the payment switch module 102 that a payment request has been made to the third-party payment service provider 118.

While this request to the third-party payment service by the payment switch module 102 is sent immediately to the third-party payment service provider 118, there can be some delay or an amount of time before the third-party payment service provider 118 actually transfers money into the account within the third-party payment service provider maintained by the receiver's financial institution 104B.

Therefore, the receiver's financial institution 104B may wait a certain period of time before it issues a credit to the receiver's account which corresponds to the amount or balance that will be transferred by the third-party payment service provider into the account at the third-party payment service provider maintained by the receiver's financial institution 104B.

Also in block 1114, the third-party payment service provider 118 may generate a payment complete message that is sent through the process payment status API 106D1 that is described above in connection with FIG. 1B. Following block 1114, in block 1120, upon receiving the payment complete message from the third-party payment service provider 1118 via the process payment status API 106D1, the payment switch module 102 may update the transaction database to reflect that the payment has been completed.

Next, in block 1122, the payment switch module may generate a message that is sent through the process payment status API 106D1 for notifying the receiver's financial institution 104B that the payment from the third-party service payment account has been completed. In block 1124, the receiver's financial institution 104B may generate a message for relating to the portable computing device 101B of the receiver which indicates that the payment or transfer from the third-party payment service account has been completed.

This message may be sent through secure e-mail that is internal within the receiver's financial institution 104B. In this way, when the receiver logs into the receiver's financial institution 104B, the secure e-mail notifying the receiver of the transferred funds may be waiting for the receiver to review. The method 1100B then ends.

Figure 12:
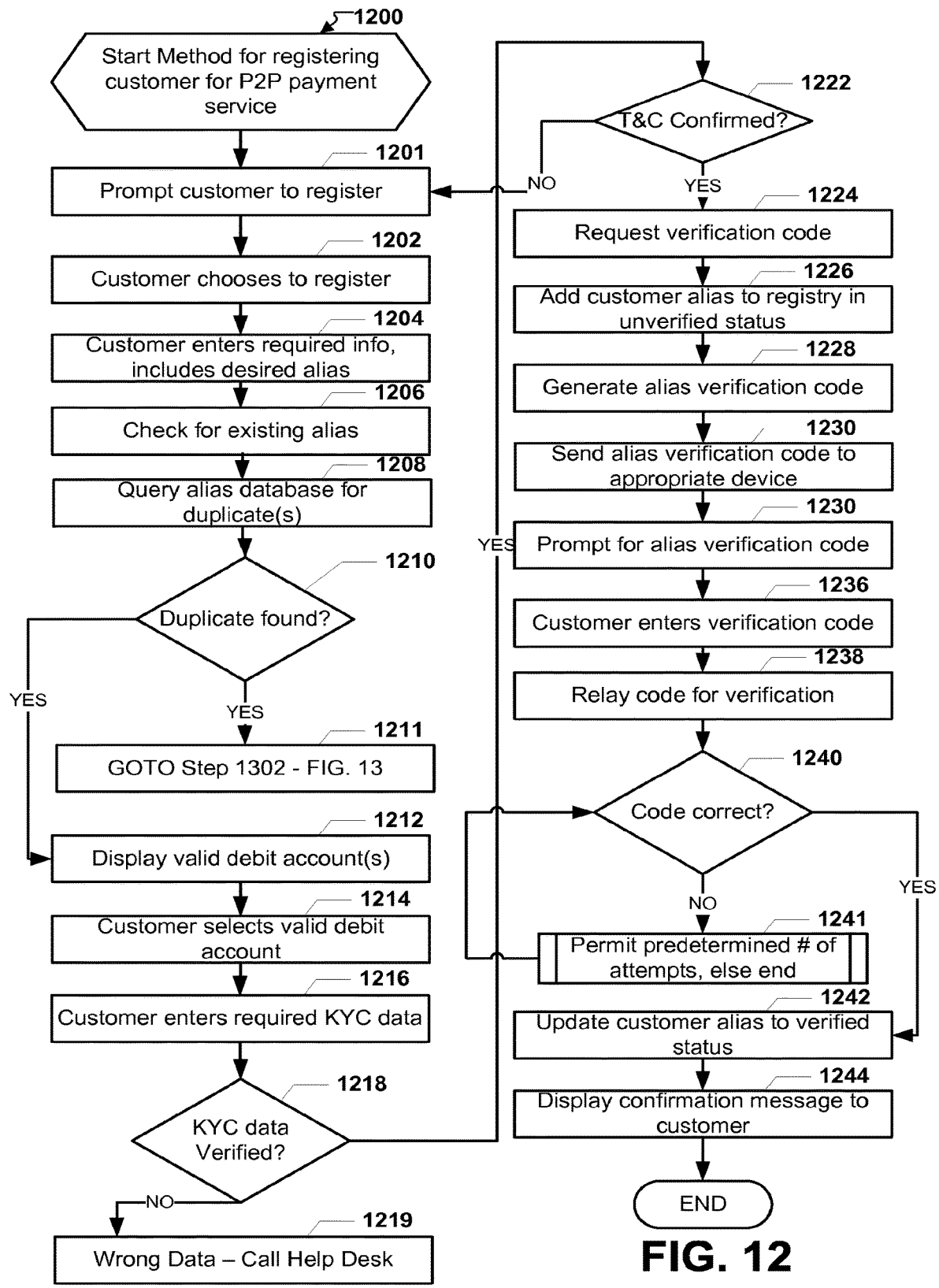
FIG. 12 illustrates a flowchart of a method for registering a financial account holder for a person-to-person payment supported by the payment switch module.

FIG. 12 illustrates a flowchart of a method 1200 for registering a financial account holder for a person-to-person payment supported by the payment switch module 102. Block 1201 is the first step in method 1200.

In block 1201, a financial institution 104 may prompt one of its customers to register for person-to-person payment process supported by the payment switch module 102. The financial institution 104 may prompt its customers when they log on to the website of the financial institution 104 during an online banking session or during a mobile banking session with a portable computing device 101.

Next, in block 1202, the customer selects the option for registering for the person-to-person payment process. Then in block 1204, the financial institution 104 may receive appropriate alias information for the person-to-person payment process. The appropriate alias information that is entered by the customer using a portable computing device 101 may include, but is not limited to, the customers e-mail address, the customers mobile phone number, the customers first name, and the customer's last name. One of ordinary skill the art recognizes that some of this alias information, like first name and last name, may be uncovered and pre-populated or listed for the customer to select from based on existing records present at the financial institution 104.

Next, upon receiving this information in block 1206, the financial institution 104 may generate a message that requests the payment switch module 102 to check for existing aliases relative to the alias information provided by the customer under this process 1200. The financial institution 104 may submit this message through the identify payee API 106B2 that is described above in connection with FIG. 1B.

Next, in block 1208, upon receiving the message from the financial institution 104 via the identify payee API 106B2, the payment switch module 102 may query our search the consumer alias registry database 108A to check for duplicate alias information. Subsequently, in decision block 1210, the payment switch module 102 determines if a duplicate alias has been found within the database 108A.

If the inquiry to decision block 1210 is positive, then the "YES" branch is followed to block 1211 in which the method 1200 goes to block 1302 of FIG. 13 described in detail below. If the inquiry to decision block 1210 is negative, then the "NO" branch is followed to block 1212. If the negative condition is met in block 1210, the payment switch module 102 generates a message that is sent to the financial institution 104 through the identify payee API 106B2.

Next, in block 1212, upon receipt of the message from the payment switch module 102 via the identify payee API 106B2 advising that no duplicate alias has been found, a financial institution 104 generates a message for sending to a portable computing device 101 that displays available debit accounts that the customer may select from for receiving and sending person-to-person payments.

In block 1214, the customer using his portable computing device 101 may select a debit account maintained at defining to institution 104 to be used for the person to person payments. Next, in block 1216, the customer via the portable computing device 101 may be prompted to enter know your customer ("KYC") data.

This block 1216 may be optional at the discretion of each financial institution 104. KYC data may include, but is not limited to, personal information that a financial institution 104 may utilize to verify the identity of the customer. For example, the KYC data may include one or more challenge questions, the password to the online banking account, the customer's home address in years past, and the maiden name of the customer's mother or mother-in-law, etc. Such KYC data may be tracked by the financial institution 104 in order to reduce fraud and/or to comply with certain banking regulations.

In decision block 1218, the financial institution 104 determines if the customer entering in the KYC data with their portable computing device 101 is accurate. If the inquiry to decision block 1218 is negative, then the "NO" branch is followed to block 1219 in which the customers prompted with an error message and request to contact the help desk of the financial institution 104.

If the inquiry to decision block 1218 is positive, then the "YES" branch is followed to block 1220 in which the financial institution 104 retrieves the terms and conditions associated with the agreement for using the person-to-person payment service. In block 1220, these terms and conditions are relayed by the financial institution to the portable computing device 101 of the customer.

In decision block 1222, the portable computing device 101 executing the online banking session determines if the customer has accepted the terms and conditions associated with the person-to-person payment service supported by the financial institution 104. If the inquiry to decision block 1222 is negative, then the "NO" branch is followed back to block 1219.

If the inquiry to decision block 1222 is positive, then the "YES" branch is followed to block 1224 in which the financial institution receives the message generated by the portable computing device 101 that indicates the customer has accepted the terms and conditions of the agreement for the person-to-person payment service. Upon receipt of this message, the financial institution 104 may generate a message requesting a verification code from the payment switch module 102. The message may also comprise the alias selected by the customer. This message generated by the financial institution 104 in block 1224 is sent through the register account owner API 106A1 described in connection with FIG. 1B.

The verification code request comprises requesting the payment switch module 102 to generate a verification code. A verification code typically comprises random alphanumeric characters which may be sent to the customer via e-mail or via a mobile phone number in order to verify that the customer owns the e-mail account or mobile phone number selected for the alias.

Upon receipt of a message from the financial institution 104 via the register account owner API 106A1, the payment switch module in block 1246 will add the customer alias to the consumer alias registry database 108A. However, the entry of the alias will be flagged or noted as in an unverified state.

Next, in block 1228, the payment switch module 102 will generate the alias a verification code. In block 1230, the payment switch module 102 will transmit this alias verification code based on the type of alias selected. Therefore, if a customer selected in e-mail alias to associate with the person-to-person payments, then in block 1230, payment switch module 102 will transmit such an alias using the e-mail address. And vice-versa for the mobile phone number.

If the customer decides to create an account associated with two different aliases such as a mobile phone number and an e-mail address, then separate verification codes may be sent to each of these aliases. The two separate verification codes are usually different from one another.

Next, in block 1232, a financial institution 104 may prompt the customer to enter in the verification code into a portable computing device 101. As noted previously, the customer verification code supplied to the customer directly in block 1230 according to the e-mail or mobile phone number provided by the customer in block 1204. That is, the customer verification code may be present in an e-mail or in any text using a simple messaging service ("SMS") as understood by one of ordinary skill in the art.

Also in block 1232, the financial institution 104 may wait for a predetermined period of time before the verification code is expired by the payment switch module 102. This predetermined period of time may comprise lengths such as on the order of twenty-four hours to just a few hours that can be set by the payment switch module 102. There may also be at least two time periods controlling the expiration of the verification code. The payment switch module 102 may set a standard amount that is greater than any time periods established by a respective financial institution 104. In other words, each respective financial institution may set its own predetermined time period for expiring verification codes that is less than or equal to the time period specified by the payment switch module 102.

In block 1236, the customer using his portable computing device 101 may enter the verification code that was received with his portable computing device 101. This information collected from the customer using his portable computing device 101 is relayed to the financial institution in block 1236.

Upon receiving this information in block 1238, a financial institution 104 may generate a message requesting verification of the code that has been received. The financial institution 104 may send this message via the verify alias API 106A4 as described above in connection with FIG. 1B.

Upon receiving this information via the verify alias API 106A4, the payment switch module 102 in decision block 1240 may determine if the supplied code matches the actual code which was sent to the customer. If the inquiry to decision block 1240 is negative, then the "NO" branch may be followed to routine or submethod block 1241 in which the financial institution 104 may track a number of times that a wrong verification code is provided. If the number of times that a wrong verification code is provided exceeds a certain threshold, such as on the order of three or four attempts, the financial institution 104 may cancel the registration process. Further details of routine or submethod block 1241 will be described below in connection with FIG. 14.

If the inquiry to decision block 1240 is positive, then the "YES" branch is followed to block 1242. In block 1242, the payment switch module 102 updates the consumer alias registry database 108A to reflect a new status that the alias has been verified by the customer and is ready for use in the person-to-person payment process. Also in block 1242, payment switch module 102 may generate a message for relaying to the financial institution 104 via the verify alias API 106A4.

In block 1244, upon receiving the message that the alias has been verified by the customer via the verify alias API 106A4, the financial institution 104 may generate a message that relays this verified status to the portable computing device 101 of the customer. The process or method 1200 then ends.

Figure 13:
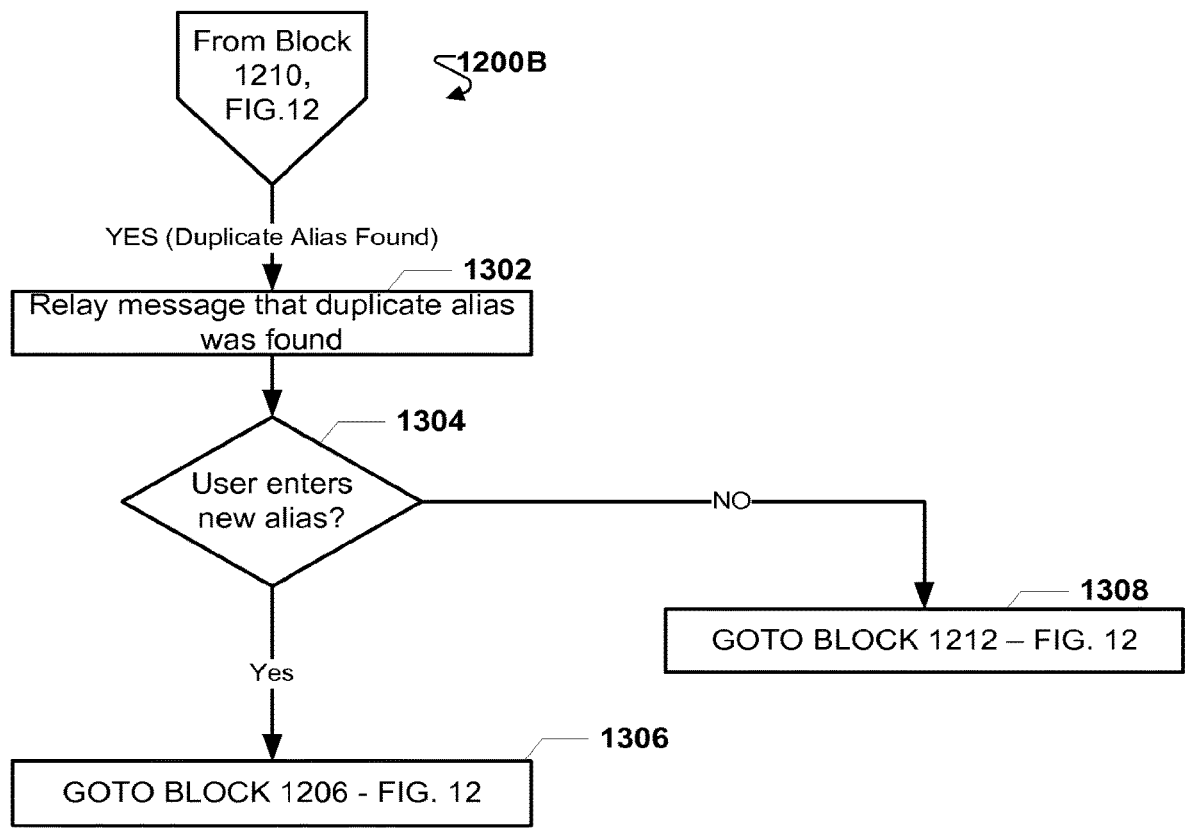
FIG. 13 illustrates a continuation flowchart of a method for registering a financial account holder for a person-to-person payment supported by the payment switch module.

FIG. 13 illustrates a continuation flowchart of a method 1200B for registering a financial account holder for a person-to-person payment supported by the payment switch module 102. Block 1302 is the first step in method 1200B which originates from a negative result or the "NO" branch following decision block 1210 of FIG. 12 in which the payment switch module 102 discovers a duplicate alias in the consumer alias registry 108A.

A duplicate alias may exist for many customers of the financial institutions 104. Duplicate aliases may occur when a customer registers for person-to-person payments with two more financial institutions 104. The payment switch module 102 cannot assume that the identity of a customer is the same when duplicate aliases are found.

In some instances, it is possible for a customer to have a typographical error which causes a duplicate match between existing aliases within the alias registry database 108A. This method 1200B comprises a verification that a same customer is registering identical alias when duplicate aliases are found within the alias registry database 108A.

In block 1302, the financial institution 104 generates a message that is relayed to the portable computing device 101 of the customer which indicates that a duplicate alias has been found. The message may comprise language such as the following: "this alias has already been registered. Please verify that you have entered the correct alias. If you have registered this alias that another participating financial institution, please continue with this registration process for the registration with the current financial institution."

Next, in decision block 1304, a portable computing device 101 determines if a new alias has been entered by the customer. If the inquiry to decision block 1302 is negative, meaning that the customer has confirmed that he or she has correctly entered the alias alphanumeric characters, then the "NO" branch is followed to block 1308 in which the method is directed back to block 1212 of FIG. 12. As noted previously, in block 1212 of FIG. 12, a message is generated by the financial institution to display valid debit accounts available to the customer.

If the inquiry to decision block 1302 is positive, meaning that the customer made a typographical error and/or desires to enter a new alias, then the "YES" branch is followed to block 1306. In block 1306, the method is directed back to block 1206 of FIG. 12. As noted previously, in block 1206 of FIG. 12, the financial institution 104 generates a request for the payment switch module 102 to conduct another inquiry of the alias registry database 108A.

Figure 14:
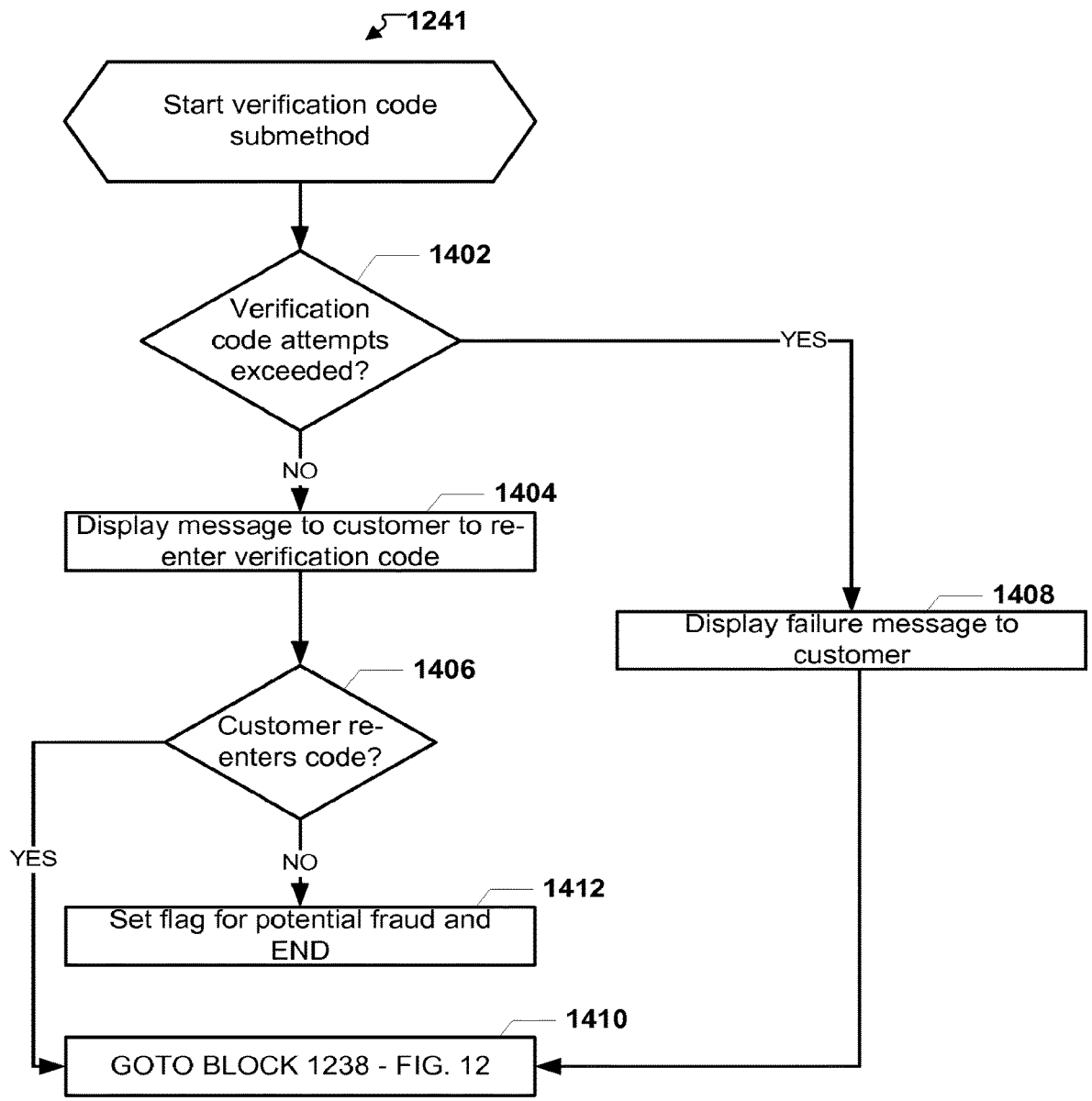
FIG. 14 illustrates submethod or routine of the method of FIG. 12 described above that addresses when the customer has not entered the correct verification code after the financial institution has transmitted the code to the device associated with the alias.

FIG. 14 illustrates submethod or routine 1241 of method 1200A, described above, that addresses when the customer has not entered the correct verification code after the financial institution 104 has transmitted the code to the device associated with the alias (i.e. —phone number or e-mail address). Submethod 1241 is part of the verify alias API 106A5 described above.

Decision Block 1402 is the first step in sub-method 1241 which originates from a negative result or the "NO" branch following decision block 1240 of FIG. 12 in which the payment switch module 102 has determined that the wrong verification code has been entered by the customer.

Decision block 1402 dictates or governs the number of attempts the customer is permitted to enter in a valid verification code. The number of attempts may be adjusted by the payment switch module 102. Exemplary ranges of attempts include, but are not limited to, a range between two attempts to five attempts. However, any number of attempts greater than or less than this range is within the scope of this disclosure as understood by one of ordinary skill in the art.

If the inquiry to decision block 1402 is negative, then the "NO" branch is followed to block 1404. Block 1404 includes the financial institution 104 generating a message that is relayed to the portable computing device 101 of the customer to reenter the verification code.

Next, in decision block 1406, the financial institution 104 determines if the customer has reentered the verification code. If the inquiry to decision block 1406 is positive, then the "YES" branch is followed back to block 1410 which directs the sub method 1241 to return to block 1238 of FIG. 12.

If the inquiry to decision block 1406 is negative, then the "NO" branch is followed to block 1412 in which the financial institution 104 may set a flag or record an entry in the transaction database 108B for its fraud team to investigate the lack of reentry of the verification code by the customer. The sub method 1241 then ends.

Meanwhile, if the inquiry to decision block 1402 is positive, meaning that the customer has exceeded the number of attempts permitted to enter the verification code, then the "YES" branch is followed to block 1408 in which the financial institution 104 generates a message that is relayed to the portable computing device 101 of the customer indicating that the wrong verification code has been entered and that the registration process has been terminated. The message may also inform the customer to contact the helpdesk of the financial institution 104.

The submethod 1241 then continues on to block 1412 as described above in which the financial institution 104 may set a flag or record an entry in the transaction database 108B for its fraud team to investigate the lack of reentry of the verification code by the customer. The submethod 1241 then ends.

FIG. 15A is an exemplary screen display 1500A for a portable computing device 101 that lists person-to-person payment parameters 1502 that may be selected by a sender for a person-to-person payment. The parameters may include a select recipient option 1506 and a payment speed option 1508. This screen display 1500A generally corresponds with block 401 of FIG. 4A described above.

FIG. 15B is an exemplary screen display 1500B for a portable computing device 101 that lists receivers (recipients) 1506B that may be selected by a sender for a person-to-person payment. The exemplary display 1500B includes a listing 1506A of instructions for how a sender may select a recipient of a P2P payment with the portable computing device 101. This screen display 1500B generally corresponds with block 402 of FIG. 4A described above.

FIG. 15C is an exemplary screen display 1500C for a portable computing device that lists velocity payment options 1508B that may be selected by a sender in a person-to-person payment. The velocity payment options may include, but are not limited to, instant payment, next day, two day, and select date. The screen display 1500C may further include a listing 1508A of instructions on how to select the velocity payment options. This screen display 1500C generally corresponds with block 410 of FIG. 4A described above.

FIG. 15D is an exemplary screen display 1500D for a portable computing device that lists a secure party identifier 1512 that may be verified by a sender before confirming a payment to a receiver. The screen display 1500D may further comprise instructions 1510 that advise how a sender may verify the intended receiver with the secure party identifier 1512. The screen display 1500D may further comprise a listing 1514 of the payment parameters that were selected by the sender. This screen display 1500D generally corresponds with block 422 of FIG. 4A described above.

FIG. 15E is an exemplary screen display 1500E for a portable computing device 101 that lists a message 1506A that payment to a receiver has been confirmed. The screen display 1506B may list additional options 1506B that may be selected by the sender to initiate another P2P payment transaction or other banking operations with the portable computing device 101. This screen display 1500E generally corresponds with block 432 of FIG. 4A described above.

Although selected aspects have been illustrated and described in detail, it may be understood that various substitutions and alterations may be made therein without departing from the spirit and scope of the present invention.

What is claimed is:

1. A method of conducting a secure mobile device transaction with a financial institution, comprising the steps of:
    sending a request, from a first mobile device, to transfer funds from a first account associated with the first mobile device to a second account associated with a second mobile device;
    receiving, by a first financial institution processor, an alias from the first mobile device, wherein the alias identifies an operator of the second mobile device;
    comparing, by a payment switch processor, the alias to a database to determine if the alias exists within the database;
    in response to the alias existing within the database, the payment switch processor generating a payment options message for displaying one or more payment options on the first mobile device of how the funds may be transferred from the first account to the second account, the first account having a first account number, the second account having a second account number;
    receiving the payment options message, with the first mobile device, and displaying the one or more payment options on the first mobile device;
    receiving a selected transfer option and an amount with the first financial institution processor, from the first mobile device;
    verifying, with the payment switch processor, the selected transfer option against one or more risk thresholds, wherein one risk threshold comprises a maximum number of person-to-person payments permitted within a predetermined time period;
    generating a secure party identifier, with the payment switch processor, in response to the payment switch processor verifying that the selected transfer option does not exceed the one or more risk thresholds, the secure party identifier comprising a truncation of at least one of a phone number and a name of the operator of the second mobile device who will receive the selected transfer option into the second account;
    transmitting, with the first financial institution processor, the secure party identifier, the amount, and a description of the selected transfer option to the first mobile device and displaying the secure party identifier, the amount, and description of the selected transfer option on the first mobile device;
    receiving, with the first financial institution processor, a first confirmation from the first mobile device that the secure party identifier is recognized;
    sending a signal, from the second financial institution processor directly to the second mobile device, the signal comprises a message that indicates a payment is pending and a log-in to the second financial institution is needed to accept the payment;
    receiving the signal with the second mobile device;
    generating a second confirmation, with the second mobile device, that indicates at least one pending payment is accepted after the log-in to the second financial institution has been made;
    receiving, with the second financial institution processor, the second confirmation that the selected transfer option is approved for receipt into the second account associated with the second mobile device;
    generating an auto-payment option message, with the second financial institution processor, that includes options for configuring the second account for automatic receipt of future payments from the first mobile device;
    receiving the auto-payment option message with the second mobile device; and
    displaying, with a display device of the second mobile device, the auto-payment option message, the auto-payment message comprising a list of options for configuring the second account for automatic receipt of future payments from the first mobile device.

2. The method of claim 1, wherein the risk thresholds comprise at least one of a threshold assigned to a sender; a threshold assigned to a receiver; and a threshold assigned to a financial institution.

3. The method of claim 1, wherein receiving the alias further comprises receiving the alias which comprises at least one of a telephone number and an e-mail address.

4. The method of claim 1, wherein the secure party identifier further comprises a truncation of at least one of a mobile phone number, e-mail address, and mailing address associated with the operator of the second mobile device who will receive the selected transfer option into the second account.

5. The method of claim 1, wherein the first and second accounts comprise accounts managed by the first and second financial institutions, respectively.

6. The method of claim 1, wherein the first account is a different type relative to the second account.

7. The method of claim 1, wherein at least one of the accounts comprises a bank account.

8. The method of claim 1, wherein the first account comprises a bank account and the second account does not comprise a bank account.

9. A method of conducting a secure mobile device transaction with a financial institution, comprising the steps of:
sending a request, from a first mobile device, to transfer funds from a first account associated with the first mobile device to a second account associated with a second mobile device;
receiving, by a first financial institution processor, an alias from the first mobile device, wherein the alias identifies an operator of the second mobile device, the first and second mobile devices comprising mobile phones;
comparing, by a payment switch processor, the alias to a database to determine if the alias exists within the database;
in response to the alias existing within the database, the payment switch processor generating a payment options message for displaying one or payment more options on the first mobile device of how the funds may be transferred from the first account to the second account, the first account having a first account number, the second account having a second account number;
receiving the payment options message, with the first mobile device, and displaying the one or more payment options on the first mobile device;
receiving a selected transfer option and an amount with the first financial institution processor, from the first mobile device;
verifying, with the payment switch processor, the selected transfer option against one or more risk thresholds, wherein one risk threshold comprises a maximum number of person-to-person payments permitted within a predetermined time period;
generating a secure party identifier, with the payment switch processor, in response to the payment switch processor verifying that the selected transfer option does not exceed the one or more risk thresholds, the secure party identifier comprising a truncation of at least one of a phone number and a name of the operator of the second mobile device who will receive the selected transfer option into the second account;
transmitting, with the first financial institution processor, the secure party identifier, the amount, and a description of the selected transfer option to the first mobile device and displaying the secure party identifier, the amount, and description of the selected transfer option on the first mobile device;
receiving, with the first financial institution processor, a first confirmation from the first mobile device that the secure party identifier is recognized;
sending a signal, from the second financial institution processor directly to the second mobile device, the signal comprises a message that indicates a payment is pending and a log-in to the second financial institution is needed to accept the payment;
receiving the signal with the second mobile device;
generating a second confirmation with the second mobile device that indicates at least one pending payment is accepted after the log-in to the second financial institution has been made;
receiving, with the second financial institution processor, the second confirmation that the selected transfer option is approved for receipt into the second account associated with the second mobile device;
generating an auto-payment option message, with the second financial institution processor, that includes options for configuring the second account for automatic receipt of future payments from the first mobile device;
receiving the auto-payment option message with the second mobile device; and
displaying, with a display device of the second mobile device, the auto-payment option message, the auto-payment message comprising a list of options for configuring the second account for automatic receipt of future payments from the first mobile device.

10. The method of claim 9, wherein the risk thresholds comprise at least one of a threshold assigned to a sender; a threshold assigned to a receiver; and a threshold assigned to a financial institution.

11. The method of claim 9, wherein receiving the alias further comprises receiving the alias which comprises at least one of a telephone number and an e-mail address.

12. The method of claim 9, wherein the secure party identifier further comprises a truncation of at least one of a mobile phone number, e-mail address, and mailing address associated with the operator of the second mobile device who will receive the selected transfer option into the second account.

13. The method of claim 9, wherein the first and second accounts comprise accounts managed by the first and second financial institutions, respectively.

14. The method of claim 9, wherein the first account is a different type relative to the second account.

15. The method of claim 9, wherein at least one of the accounts comprises a bank account.

16. The method of claim 9, wherein the first account comprises a bank account and the second account does not comprise a bank account.

17. The method of claim 9, wherein the amount associated with the selected transfer option is available for immediate withdrawal by the operator of the second mobile device when the transfer is complete.

* * * * *